US012781884B2

(12) United States Patent
Lu et al.

(10) Patent No.: US 12,781,884 B2
(45) Date of Patent: Nov. 3, 2026

(54) PIPE FITTING SEAL AND PIPE CONNECTING STRUCTURE

(71) Applicant: SHANGHAI VISION MECHANICAL JOINT CO., LTD, Shanghai (CN)

(72) Inventors: Xubin Lu, Shanghai (CN); Zhigang Lu, Shanghai (CN); Jun Wu, Shanghai (CN); Zhibing Zhai, Shanghai (CN)

(73) Assignee: SHANGHAI VISION MECHANICAL JOINT CO., LTD, Shanghai (CN)

( * ) Notice: Subject to any disclaimer, the term of this patent is extended or adjusted under 35 U.S.C. 154(b) by 54 days.

(21) Appl. No.: 18/914,235

(22) Filed: Oct. 13, 2024

(65) Prior Publication Data

US 2025/0155057 A1 May 15, 2025

(30) Foreign Application Priority Data

Nov. 14, 2023 (CN) ......................... 202311519957.2

(51) Int. Cl.
*F16L 17/04* (2006.01)
*F16L 23/04* (2006.01)
*F16L 23/08* (2006.01)
*F16L 25/14* (2006.01)

(52) U.S. Cl.
CPC ............... *F16L 17/04* (2013.01); *F16L 23/04* (2013.01); *F16L 23/08* (2013.01); *F16L 25/14* (2013.01)

(58) Field of Classification Search
CPC . F16L 17/04; F16L 23/04; F16L 23/06; F16L 23/08; F16L 25/14
See application file for complete search history.

(56) References Cited

U.S. PATENT DOCUMENTS 1,905,324 A * 4/1933 Waters .................... F16L 17/04
3,315,970 A * 4/1967 Holoway
3,351,352 A * 11/1967 Blakeley
3,680,894 A * 8/1972 Young ..................... F16L 17/04
3,977,705 A * 8/1976 Thiessen
5,911,446 A * 6/1999 McLennan
8,550,502 B2 * 10/2013 Vandal
8,646,814 B2 * 2/2014 Lippka .................... F16L 17/04
9,404,608 B2 * 8/2016 Lippka .................... F16L 17/04
11,060,639 B2 * 7/2021 Cuvo ...................... F16L 17/04
(Continued)

FOREIGN PATENT DOCUMENTS

CN 1267804 A * 9/2000 .............. F16L 23/04

OTHER PUBLICATIONS

CN-1267804-A—Machine Translation—English (Year: 2000).*

*Primary Examiner* — William S. Choi
(74) *Attorney, Agent, or Firm* — Che-Yang Chen

(57) ABSTRACT

A pipe fitting seal includes a sealing ring for being arranged between two pipe elements, a connecting base is arranged on an outside of the sealing ring, an outer biasing portion is arranged on an inner of the connecting base, a first abutting surface is formed on an outer wall of the connecting base, the first abutting surface can be squeezed to drive the outer biasing portion to abut against an outer wall of the pipe element, and a second abutting inclined surface is formed on a side of the connecting base away from the sealing ring, the second abutting inclined surface can be squeezed to drive the sealing ring to abut against an end of the other pipe element.

10 Claims, 33 Drawing Sheets

(56) References Cited

U.S. PATENT DOCUMENTS

| | | | | |
|---|---|---|---|---|
| 11,313,496 | B2 * | 4/2022 | Lippka | F16L 17/04 |
| 12,338,920 | B2 * | 6/2025 | Bancroft | F16L 17/04 |
| 2010/0102549 | A1 * | 4/2010 | Radzik | F16L 17/04 |
| 2011/0062706 | A1 * | 3/2011 | Henry | F16L 17/04 |
| 2022/0186862 | A1 * | 6/2022 | Lu | |

* cited by examiner

PIPE FITTING SEAL AND PIPE CONNECTING STRUCTURE

CROSS REFERENCE OF RELATED APPLICATION

This application is a non-provisional application that claims priority under 35 U.S.C. § 119 to China application number CN202311519957.2, filing date Nov. 14, 2023, wherein the entire content of which is expressly incorporated herein by reference.

BACKGROUND OF THE PRESENT INVENTION

Field of Invention

The present invention relates to the field of pipe seal, and more particularly to a pipe fitting seal and a pipe connecting structure.

Description of Related Arts

Pipe seals are annular parts installed at pipe coupling ends to fill the gaps between pipe joints and ensure the sealing performance of the pipe system. Stainless steel water pipe fitting sealing rings play an important role in the piping system. The sealing rings can not only prevent leakage and resist corrosion, but also relieve vibration and impact to ensure the efficiency and safety of fluid transmission. In the prior art, the seal is in the shape of a ring and is arranged between two pipe elements. Under the action of the quick-fitting pipe fitting joint, the two pipe elements can be pulled closer to each other. When the two pipe elements are close to each other, the sealing ring is squeezed and deformed, thereby filling the gap between the two pipe elements and achieving sealing of the pipe fitting joint.

With respect to the above-mentioned related technologies, the current sealing rings are all deformed by the extrusion of the pipe elements to make the connection between the seal and the pipe elements close to each other, thereby achieving the purpose of sealing the connection between the pipe elements. The sealing rings are usually made of rubber materials. On one hand, under the extrusion of the two pipe elements, the position in contact with each pipe elements will produce a large deformation under the extrusion of the two pipe elements, resulting in a reduction in the thickness of the sealing ring at the contact position with the corresponding pipe element, and causing the deformed rubber to deform to both sides of the contact position, greatly affecting the service life of the rubber. On the other hand, the pipeline is generally in a high-pressure and high-temperature environment, which will reduce the service life of the rubber material, make the position where the seal produces a large deformation harden and become brittle, so that the service life of the pipe fitting connection will be affected, and thus urgently need to be improved.

SUMMARY OF THE PRESENT INVENTION

In order to reduce the deformation amplitude of the connection between the seal and the pipe element per unit length, reduce the damage to the seal, and ensure the service life of the seal, the present application provides a pipe fitting seal and a pipe connecting structure.

The present application provides a pipe fitting seal and a pipe connecting structure that adopts the following technical solutions.

A pipe fitting seal comprises a sealing ring for being arranged between two pipe elements, a connecting base is arranged on an outside of the sealing ring, an outer biasing portion is arranged on an inner side of the connecting base, a first abutting surface is formed on an outer wall of the connecting base, the first abutting surface can be squeezed to drive the outer biasing portion to abut against the outer wall of one pipe element, a second abutting inclined surface is formed on the side of the connecting base away from the sealing ring, the second abutting inclined surface can be squeezed to drive the sealing ring to abut against an end of the other pipe element.

By adopting the above technical solution, when in use, the sealing ring is installed between the two pipe elements, and the pipe elements are abutted against the sealing ring. When the pipe elements are connected, external pressure is applied to the first abutting surface, so that the outer biasing portion abuts against the outer wall of the one pipe element, thereby achieving sealing of the one pipe element, and then external pressure is applied to the second abutting inclined surface, so that a side wall of the sealing ring abuts against the end of the other pipe element, thereby achieving sealing of the other pipe element. With such a design, the sealing positions of the seal and the two pipe elements do not overlap, which greatly reduces the deformation amplitude of the seal at the sealing position with the two pipe elements within a unit length, thereby reducing the damage to the seal caused by deformation and ensuring the service life of the seal.

Optionally, an abutment ring is provided on the inner side of the connecting base, and a third abutting inclined surface is provided on one side of the connecting base adjacent to the sealing ring, the third abutting inclined surface can be squeezed to drive the abutment ring to abut against the outer wall of the pipe element.

By adopting the above technical solution, pressure is applied to the third abutting inclined surface. On one hand, the pressure applied by the second abutting inclined surface can be balanced and matched with the pressure applied by the third abutting inclined surface, so that the sealing ring can abut against the end of the other pipe element more evenly, ensuring the sealing effect to the other pipe element; on the other hand, cooperating with the second abutting inclined surface which is applied with a pressure, the abutment ring can abut against the one pipe element, so that the one pipe element can be better sealed and the sealing effect to the one pipe element can be improved, and when the abutment ring is squeezed, the abutment ring can be deformed, so that the sealing ring can be driven to better abut against the end of the other pipe element, thereby improving the sealing effect to the other pipe element.

Optionally, an outer sealing inclined surface is provided on a side of the outer biasing portion away from the connecting base, and the outer sealing inclined surface is inclined along a direction away from the connecting base toward the sealing ring.

By adopting the above technical solution and using an inclined outer biasing portion, when the outer biasing portion is deformed, the outer sealing inclined surface can better abut against the outer wall of the one pipe element, and by configuring the outer biasing portion to be inclined in a direction toward the sealing ring, a stronger pressure can be applied to the position adjacent to the sealing positions of the two pipe elements, thereby reducing leakage of the fluid in the pipe elements and improving the sealing effect of the seal.

Optionally, a deformation ring groove is formed on a side of the outer biasing portion adjacent to the abutment ring.

By adopting the above technical solution, the deformation ring groove can provide sufficient deformation space for the outer biasing portion, so that the outer sealing inclined surface on the outer biasing portion can better abut against the outer wall of the one pipe element, thereby improving the sealing effect to the one pipe element.

Optionally, both sides of the sealing ring are provided with abutting arc surfaces for abutting against the pipe elements.

By adopting the above technical solution, the pipe elements can be respectively directly plugged into the abutting arc surfaces, so that the pipe elements can abut against the sealing ring more closely, thereby improving the sealing performance of the pipe fitting seal.

Optionally, at least one sealing pressing block is provided on a side of the sealing ring adjacent to the outer biasing portion.

By adopting the above technical solution, the sealing pressing block can push the sealing ring after a certain deformation occurs to the sealing ring, so that the sealing ring can better cooperate with the one pipe element to improve the sealing effect of the seal.

Optionally, an inner biasing portion is provided on a side of the sealing ring away from the connecting base, the inner biasing portion is extended in a direction away from the sealing ring, and the inner biasing portion abuts against an inner wall of the other pipe element.

By adopting the above technical solution, the inner biasing portion can increase the contact area between the sealing ring and the other pipe element, thereby enhancing the sealing effect of the seal.

Optionally, a deformable pressing ring is provided on a side of the inner biasing portion away from the sealing ring, and an outer diameter of the deformable pressing ring gradually increases in a direction away from the inner biasing portion.

By adopting the above technical solution, the deformable pressing ring is set toward the inner wall of the other pipe element, so that the deformable pressing ring can better press against the inner wall of the other pipe element, and an outer diameter of the deformable pressing ring is gradually reduced, so that an end of the deformable pressing ring away from the inner biasing portion can press against the inner wall of the other pipe element more firmly, reducing the warping phenomenon of the deformable pressing ring, improving the stability of the seal, and ensuring the sealing effect of the seal.

Optionally, a transition arc surface is formed on an inner wall of the deformable pressing ring, and an inner diameter of the deformable pressing ring gradually increases in a direction away from the inner biasing portion.

By adopting the above technical solution and processing the transition arc surface, the resistance during the flow of fluid in the other pipe element can be reduced, so that the fluid can flow more smoothly, and the transition arc surface can reduce the warping phenomenon of the deformable pressing ring, thereby improving the sealing effect of the deformable pressing ring on the other pipe element.

Optionally, a limiting ring that is plugged into and fits with the inner wall of the other pipe element is integrally formed on an outer wall of the inner biasing portion.

By adopting the above technical solution, the use of the limiting ring can increase the contact area between the inner biasing portion and the other pipe element, so that the inner biasing portion can better seal the other pipe element.

Optionally, a pipe connecting structure comprises a first pipe element and a second pipe element, a clamping assembly is arranged between the first pipe element and the second pipe element, the clamping assembly comprises at least two pivotally movable clamping members and at least one fastener, the fastener is used to tighten the two movable clamping members, each movable clamping members is provided with a limiting cavity for limiting the connecting base, an inner wall of the limiting cavity is formed with a first limiting surface abutting the first abutting surface, and the two sides of the limiting cavity are respectively formed with a second limiting surface and a third limiting surface abutting the second abutting inclined surface and the third abutting inclined surface.

By adopting the above technical solution, the two clamping members are brought close to each other, and the connecting base is inserted into the limiting cavity, and under the action of the first limiting surface, the second limiting surface and the third limiting surface, the connecting base is pushed to be extruded and deformed, and under the cooperation of the first limiting surface and the second limiting surface, the outer sealing inclined surface and the abutment ring abut against the outer wall of the first pipe element, thereby achieving the effect of double sealing of the first pipe element; under the action of the second limiting surface and the third limiting surface, the sealing ring can be pushed to abut against the end of the second pipe element, thereby better ensuring the overall sealing effect of the seal and improving the stability of the pipe connecting structure.

Optionally, limit stop rings are provided on both sides of each movable clamping member, and limit ring grooves that are plugged into and cooperate with the limit stop rings are formed on the outer walls of the first pipe element and the second pipe element, and abutment surfaces are formed on the two side walls where the limit ring grooves engaging with the limit stop rings, and the abutment surfaces are arranged perpendicular to an axial direction of the first pipe element.

By adopting the above technical solution, the limit ring groove and the limit stop ring are plugged in and engaged, so as to realize the locking between the first pipe element and the second pipe element, and then cooperate with the abutting surfaces to press against each other. When the movable clamping members are fastened, the first pipe element and the second pipe element are getting close to each other and squeezing the sealing ring, thereby reducing damage to the sealing ring and ensuring the service life of the seal.

Optionally, after the seal is fixedly installed, an inner diameter of the sealing ring, an inner diameter of the first pipe member and an inner diameter of the second pipe member are kept consistent.

By adopting the above technical solution, the situation where the sealing ring extends into the interior of the pipe elements can be reduced, thereby reducing the resistance during the use of the pipe elements, improving the convenience of using the connecting structure, and reducing the erosion of the sealing ring by the liquid in the pipe elements, thereby ensuring the service life of the sealing ring.

Optionally, an inner wall of the second pipe element is provided with a drag-reducing ring groove which is plug-fitting with the inner biasing portion.

By adopting the above technical solution, the inner biasing portion is inserted into the drag reduction ring groove, which can reduce the impact of the internal fluid of the second pipe element on the inner biasing portion, reduce the erosion of the seal, and increase the service life of the seal. It can also enable the inner biasing portion to more firmly press against the inner wall of the drag reduction ring groove to improve the sealing effect of the seal.

Optionally, the inner wall of the drag reduction ring groove is provided with a limiting slot which is plug-fitting with the limiting ring.

By adopting the above technical solution, the limiting slot and the limiting ring are plugged into and engaged with each other, so that the inner biasing portion and the second pipe element can be more firmly sealed, and the movement of the inner biasing portion is limited by the limiting ring, so that the inner biasing portion and the deformable pressing ring can be more firmly pressed against the inner wall of the second pipe element, thereby ensuring the sealing effect of the seal.

Optionally, a limiting plug ring is provided on one side of each movable clamping member, a plug-in ring groove which is plugged into and cooperates with the limiting plug ring is provided on an outer wall of the second pipe element, a limiting installation groove is provided on the other side of the corresponding movable clamping member, a clamp engaging ring is provided in the limiting installation groove, and a plurality of clamping rings are provided on a side of the clamping ring away from the corresponding movable clamping member.

By adopting the above technical solution, by using a clamp engaging ring and the clamping rings to cooperate to achieve the connection of the first pipe element, the first pipe element with the flat end can be connected to the movable clamping members more conveniently, and the stability of the movable clamping members connecting the two pipe fittings is improved.

Optionally, a limiting plug ring is provided on one side of each movable clamping member, a plug-in ring groove which is plug-fitting with the limiting insert ring is provided on an outer wall of the second pipe element, a limiting clamping groove is provided on the other side of the corresponding movable clamping member, a limiting clamp is provided on an outer wall of the first pipe element, and the limiting clamp is plug-fitting with the limiting clamping groove.

By adopting the above technical solution, the limiting clamp is first fixed to the first pipe element, and then the limiting clamp ring is used to cooperate with the limiting clamp to achieve the fixation of the first pipe element. Such a design can make the first pipe element more firmly fixed.

In summary, the present application provides at least one of the following beneficial technical effects.

When in use, the sealing ring is installed between the two pipe elements, and the pipe elements are abutted against the sealing ring. When the pipe elements are connected, external pressure is applied to the first abutting surface, so that the outer biasing portion abuts against the outer wall of the first pipe element, thereby achieving sealing of the first pipe element. Then, external pressure is applied to the second abutting inclined surface, so that the side wall of the sealing ring abuts against the end of the second pipe element, thereby achieving sealing of the other second pipe element. With such a design, the sealing positions of the seal and the two pipe elements do not overlap, which greatly reduces the deformation amplitude of the seal within a unit length at the sealing positions with the two pipe element, thereby reducing the damage to the seal caused by deformation and ensuring the service life of the seal.

Applying pressure to the third abutting inclined surface can, on one hand, balance the pressure applied by the second abutting inclined surface and cooperate with the pressure applied by the third abutting inclined surface, so that the sealing ring can abut against the end of the second pipe element more evenly, ensuring the sealing effect to the second pipe element; on the other hand, cooperating with the pressure applied by the second abutting inclined surface, the abutment ring can abut against the first pipe element, so that the first pipe element can be better sealed and the sealing effect of the first pipe element can be improved. When the abutment ring is squeezed, the abutment ring can be deformed, so that the sealing ring can be driven to better abut against the end of the second pipe element, improving the sealing effect to the second pipe element.

The deformable pressing ring is disposed in the inner wall of the second pipe element, so that the deformable pressing ring can better press against the inner wall of the second pipe element, and the outer diameter of the deformable pressing ring is gradually reduced, so that the end of the deformable pressing ring away from the inner biasing portion can press against the inner wall of the second pipe element more firmly, reduce the warping phenomenon of the deformable pressing ring, improve the stability of the seal, and ensure the sealing effect of the seal.

Figure 1:
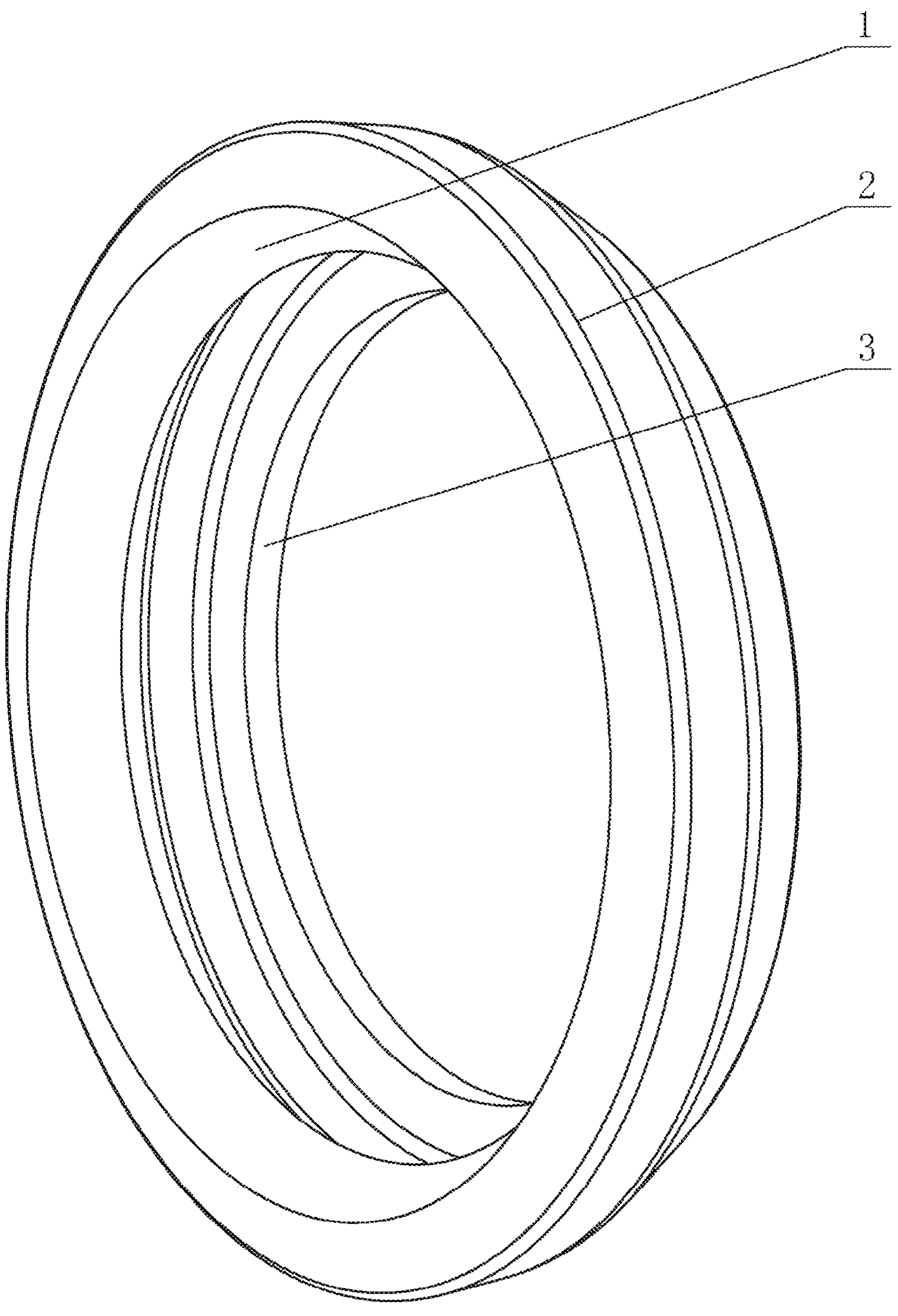
FIG. 1 is a schematic view of a pipe fitting seal according to a first embodiment of the present application.

Reference numerals: 1, outer biasing portion; 2, connecting base; 3, sealing ring; 4, second abutting inclined surface; 5, deformation ring groove; 6, outer sealing inclined surface; 7, first abutting surface; 8, third abutting inclined surface; 9, abutment ring; 10, sealing pressing block; 11, abutting arc surface; 12, inner biasing portion; 13, limiting ring; 14, deformable pressing ring; 15, transition arc surface; 16, second pipe element; 17, movable clamping member; 18, pre-installing portion; 19, first pipe element; 20, fastener; 21, limiting ring; 22, second limiting surface; 23, limiting cavity; 24, first limiting surface; 25, third limiting surface; 26, limit ring groove; 27, drag reduction ring groove; 28, clamping ring; 29, limiting installation groove; 30, clamp engaging ring; 31, limiting clamp; 32, limiting clamping groove; 33, abutment surface; 34, limiting slot; 35, plug-in ring groove; 36. limiting plug ring; 37, support locking block; 38, side support pressing block; 100, pipe fitting seal; 200, pipe fitting assembly; 301, first side stopping surface; 302, second side stopping surface; 161, second connecting end portion; 162, end wall; 163, outer wall; 164, inner wall; 191, first connecting end portion; 192, end wall; 193, outer wall.

DETAILED DESCRIPTION OF THE PREFERRED EMBODIMENT

The present application is further described in detail below in conjunction with FIGS. 1-13.

An embodiment of the present application discloses a pipe fitting seal.

Embodiment 1

Figure 2:
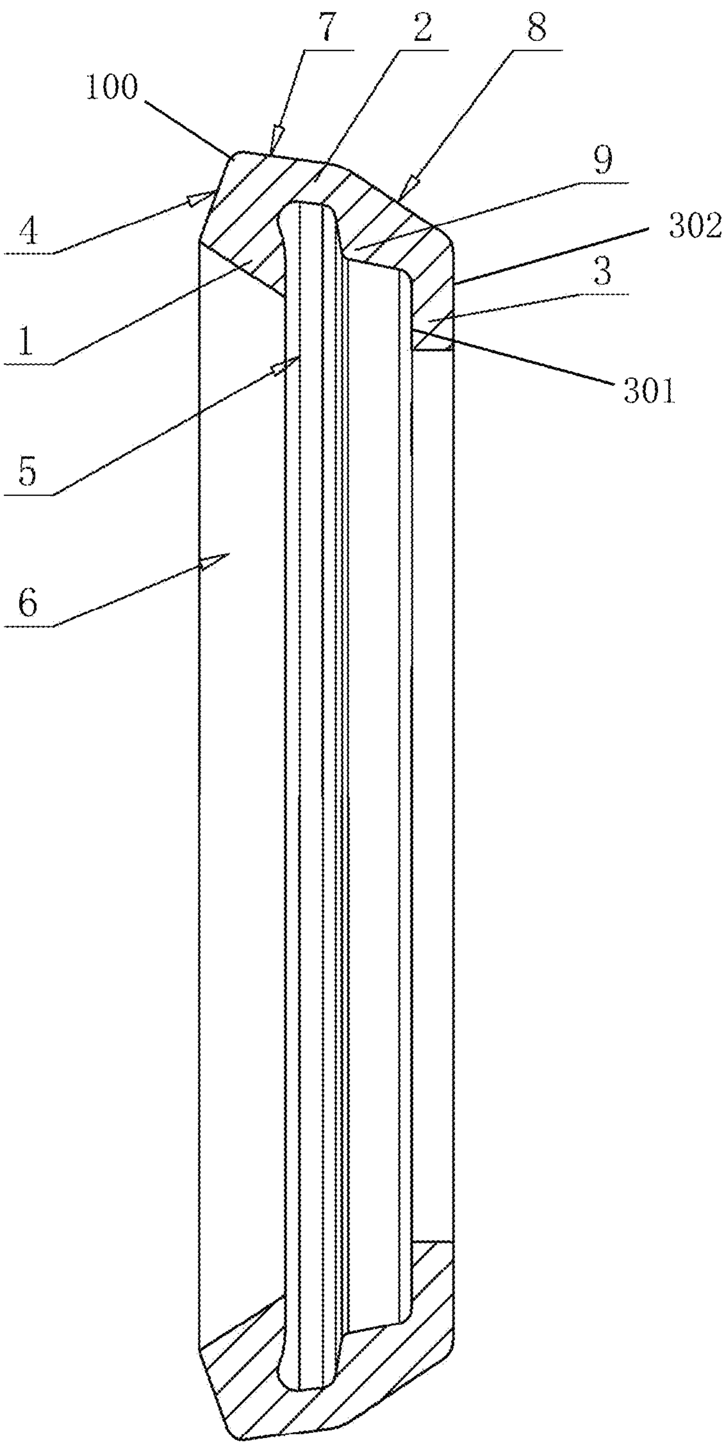
FIG. 2 is a cross-sectional view of the pipe fitting seal according to the first embodiment of the present application.

Referring to FIGS. 1 and 2, a pipe fitting seal comprises a sealing ring 3 installed between two pipe elements. The sealing ring 3 is made of rubber material. A connecting base 2 is integrally formed on an outer side of the sealing ring 3. The connecting base 2 is extending toward a direction that is close to one of the pipe elements. An outer biasing portion 1 is integrally formed on an inner side of the connecting base 2. The outer biasing portion 1 is adapted for abutting against an outer wall of the pipe element. A first abutting surface 7 is formed on an outer wall of the connecting base 2. The first abutting surface 7 is annular and is adapted for being squeezed to drive the outer biasing portion 1 to abut against the outer wall of a pipe element, thereby achieving sealing of one of the pipe elements. A second abutting inclined surface 4 is provided on a side of the connecting base 2 away from the sealing ring 3. The second abutting inclined surface 4 is inclined in a direction away from the outer biasing portion 1 toward the sealing ring 3, the second abutting inclined surface 4 can be squeezed, so as to drive the sealing ring 3 to abut against an end of another pipe element, thereby realizing the sealing of the other pipe element, so that the sealing can be achieved at different positions of the two pipe elements, so as to reduce the deformation amplitude of the seal within a unit length, and reduce the damage to the seal, and ensuring the service life of the seal.

Referring to FIGS. 1 and 2, an abutment ring 9 is integrally formed on an inner wall of the connecting base 2. The abutment ring 9 is in a circular ring shape. A side of the abutment ring 9 that is adjacent to the sealing ring 3 is integrally formed with the sealing ring 3. A third abutting inclined surface 8 is provided on the side of the connecting base 2 adjacent to the sealing ring 3. The third abutting inclined surface 8 is inclined in a direction away from the sealing ring 3 toward the outer biasing portion 1, so that the third abutting inclined surface 8 can be squeezed to drive the abutment ring 9 to abut against the outer wall of the pipe element. Under the action of the third abutting inclined surface 8, not only can the abutment ring 9 abut against the pipe element, thereby enhancing the sealing of the pipe element on the side close to the outer biasing portion 1; but also, under the action of the third abutting inclined surface 8 and the second abutting inclined surface 4, the pressure of the second abutting inclined surface 4 can better act on the sealing ring 3, so that the sealing ring 3 can more firmly abut against the other pipe element which is away from the outer biasing portion 1, thereby improving the sealing effect of the seal.

An outer sealing inclined surface 6 is formed on a side of the outer biasing portion 1 away from the connecting base 2. The outer sealing inclined surface 6 is formed in an inclined manner from a direction away from the connecting base 2 towards the sealing ring 3. By adopting this approach, the outer biasing portion 1 can have a better deformation space.

Under the action of the extrusion force of the first abutting surface 7, the outer sealing inclined surface 6 can abut against the outer wall of the pipe element, and the sealing positions of the two pipe elements can be applied with a greater pressure, thereby reducing the warping phenomenon of the outer biasing portion 1 and improving the convenience of using the outer biasing portion 1. A deformation ring groove 5 is formed on a side of the outer biasing portion 1 adjacent to the abutting ring 9. On one hand, the deformation ring groove 5 can provide the outer biasing portion 1 with sufficient deformation space, thereby improving the convenience of extruding the outer biasing portion 1; on the other hand, after the outer biasing portion 1 is extruded and deformed, when the liquid in the pipe elements flows into the deformation ring groove 5, pressure can be generated on the deformed outer biasing portion 1, so that the outer sealing inclined surface 6 can be more firmly pressed against the pipe element, thereby ensuring the sealing effect of the seal.

Figure 29:
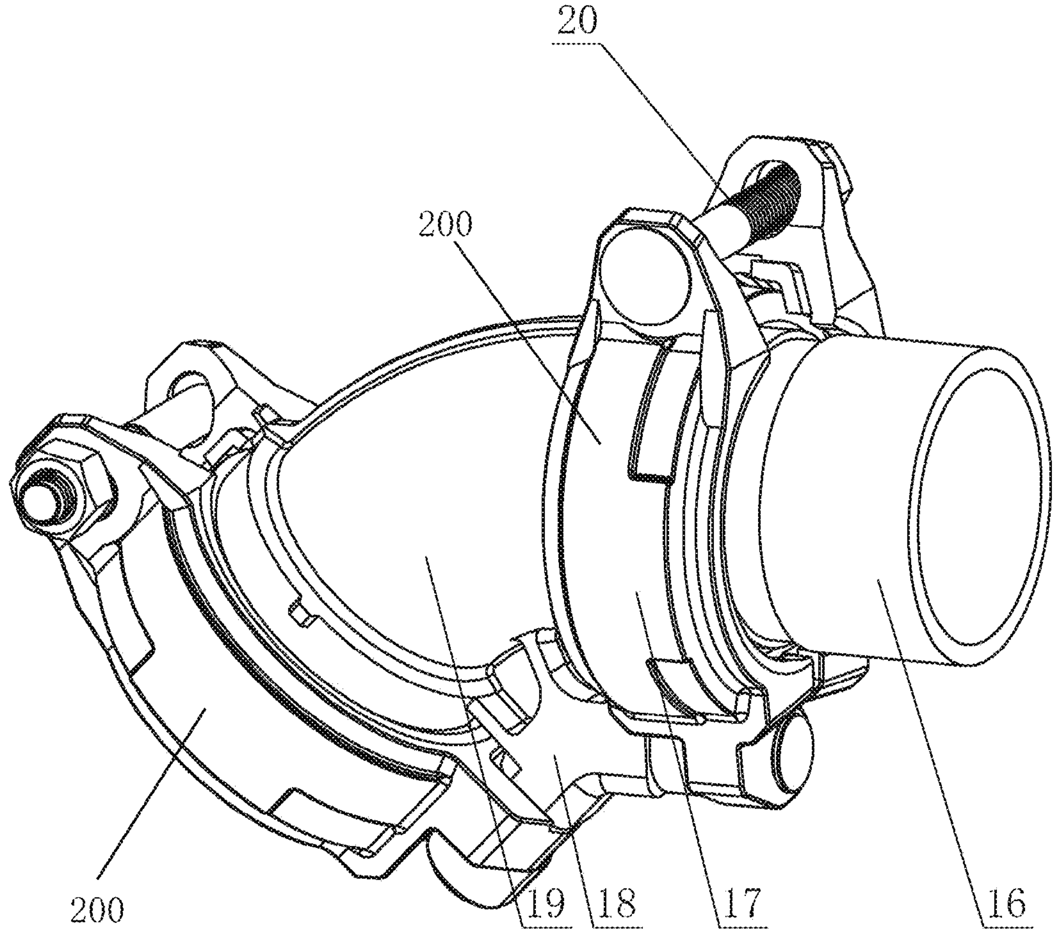
FIG. 29 is a schematic view of a pipe connecting structure according to the first embodiment of the present application.
Figure 30:
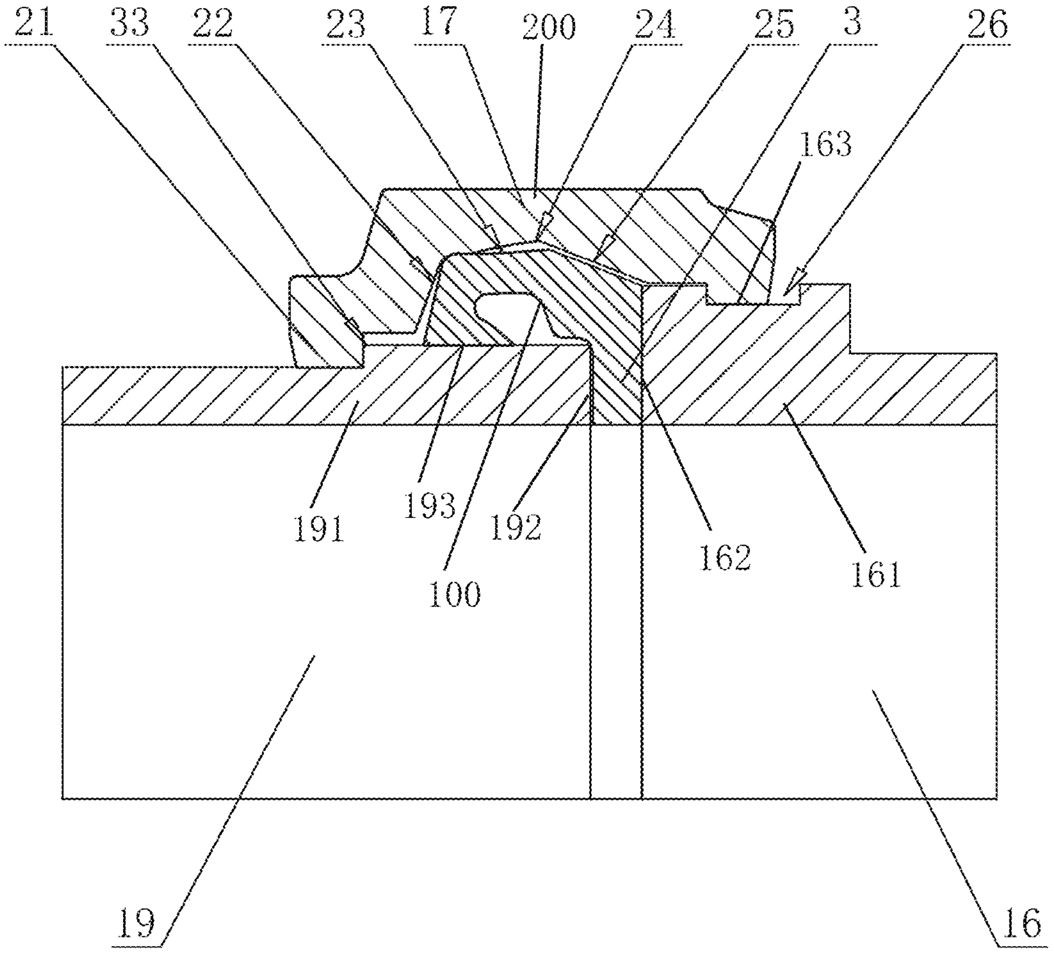
FIG. 30 is a cross-sectional view of the pipe connecting structure according to the first embodiment of the present application.

Referring to FIGS. 29 and 30, a pipe connecting structure comprises a first pipe element 19 and a second pipe element 16, a pipe fitting seal is fixed between the first pipe element 19 and the second pipe element 16, a clamping assembly is installed between the first pipe element 19 and the second pipe element 16, the clamping assembly comprises two pivotally movable clamping members 17 and a fastener 20 which is used to tighten the two movable clamping members 17, a limiting cavity 23 for limiting the connecting base 2 is formed in each movable clamping member 17, an inner wall of the limiting cavity 23 is formed with a first limiting surface 24 abutting against the first abutting surface 7, and the two sides of the limiting cavity 23 are respectively formed with a second limiting surface 22 and a third limiting surface 25 for abutting against the second abutting inclined surface 4 and the third abutting inclined surface 8. The movable clamping members 17 can enable the seal to be stably installed between the first pipe member 19 and the second pipe member 16, thereby improving the fixation stability of the seal. The inner diameters of the sealing ring 3, the first pipe member 19 and the second pipe member 16 are consistent.

Referring to FIGS. 29 and 30, each of the movable clamping members 17 is C-shaped, and limit stop rings 21 are integrally formed on both sides of each movable clamping member 17. Limit ring grooves 26 that are respectively engaged with the limit stop rings 21 are formed on outer walls of the first pipe member 19 and the second pipe member 16. Abutment surfaces 33 are formed on the side walls where the limit ring grooves 26 are engaging with the limit stop rings 21, and the abutment surfaces 33 are arranged perpendicular to an axial direction of the first pipe member 19. Thereby, the squeezing of the sealing ring 3 by the first pipe member 19 and the second pipe member 16 can be reduced, the deformation amplitude of the sealing ring 3 per unit length can be reduced, and the service life of the seal can be ensured.

Referring to FIG. 29, a pre-installing portion 18 is provided to an outer wall of the first pipe element 19, and the two movable clamping members 17 are both pivotally connected to the pre-installing portion 18, so that the two movable clamping members 17 can be used more conveniently.

The implementation principle of the first embodiment is as follows: when using the seal, the sealing ring 3 is set between the first pipe element 19 and the second pipe element 16, and the two pipe element are connected together using a quick-fitting pipe fitting, and pressure is generated on the first abutting surface 7, the second abutting inclined surface 4 and the third abutting inclined surface 8. The sealing of the first pipe element 19 is achieved through the external biasing portion 1 and the abutting ring 9, and the sealing of the other pipe element, i.e. the second pipe element 16, is achieved through the sealing ring 3, so that the sealing of the two pipe elements can be achieved from different positions. By adopting such a design, the deformation amplitude of the seal within a unit length can be greatly reduced, the damage to the seal can be reduced, and the service life of the seal can be increased.

Embodiment 2

Figure 13:
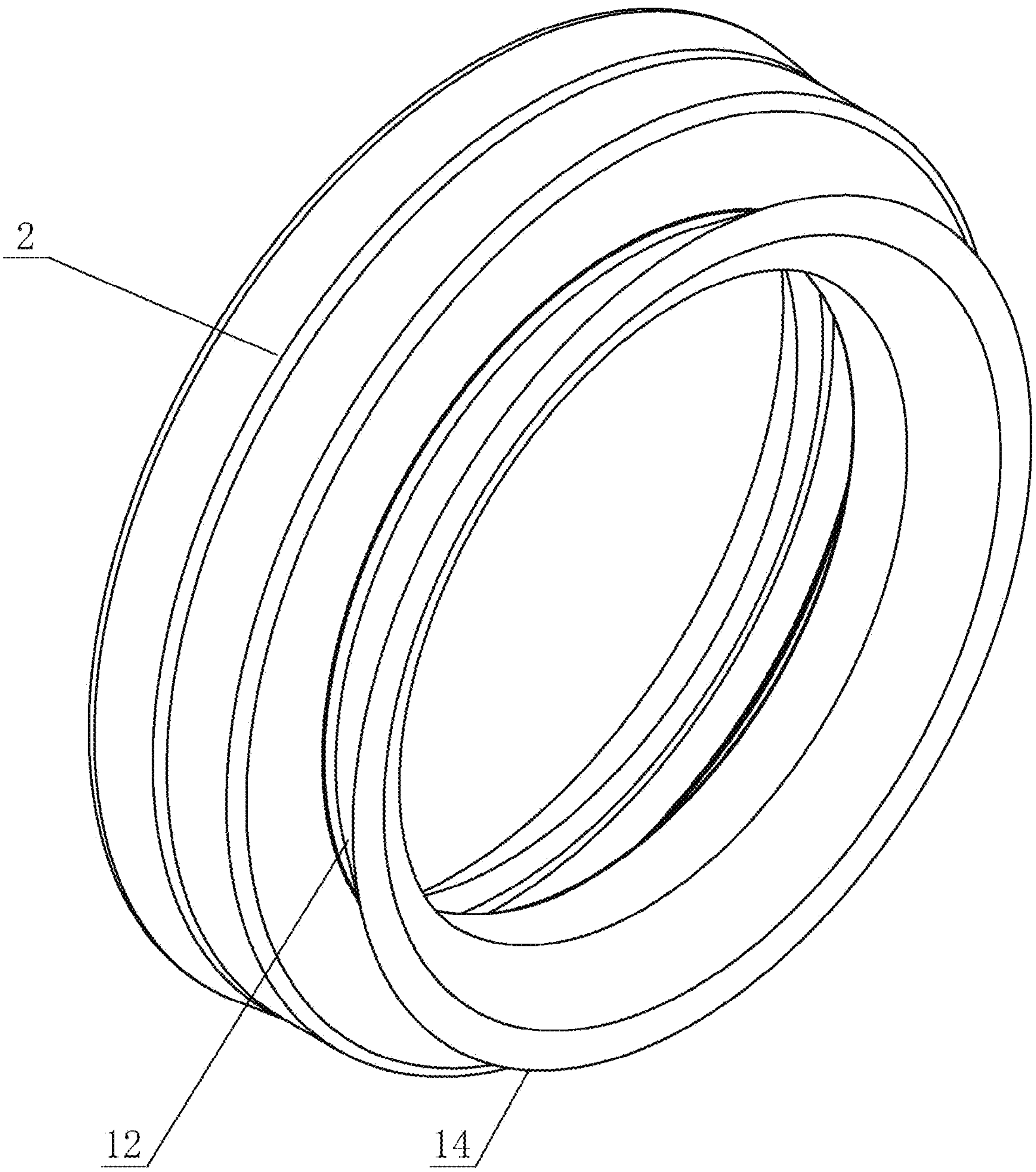
FIG. 13 is a schematic view of a pipe fitting seal according to a first example of a second embodiment of the present application.
Figure 14:
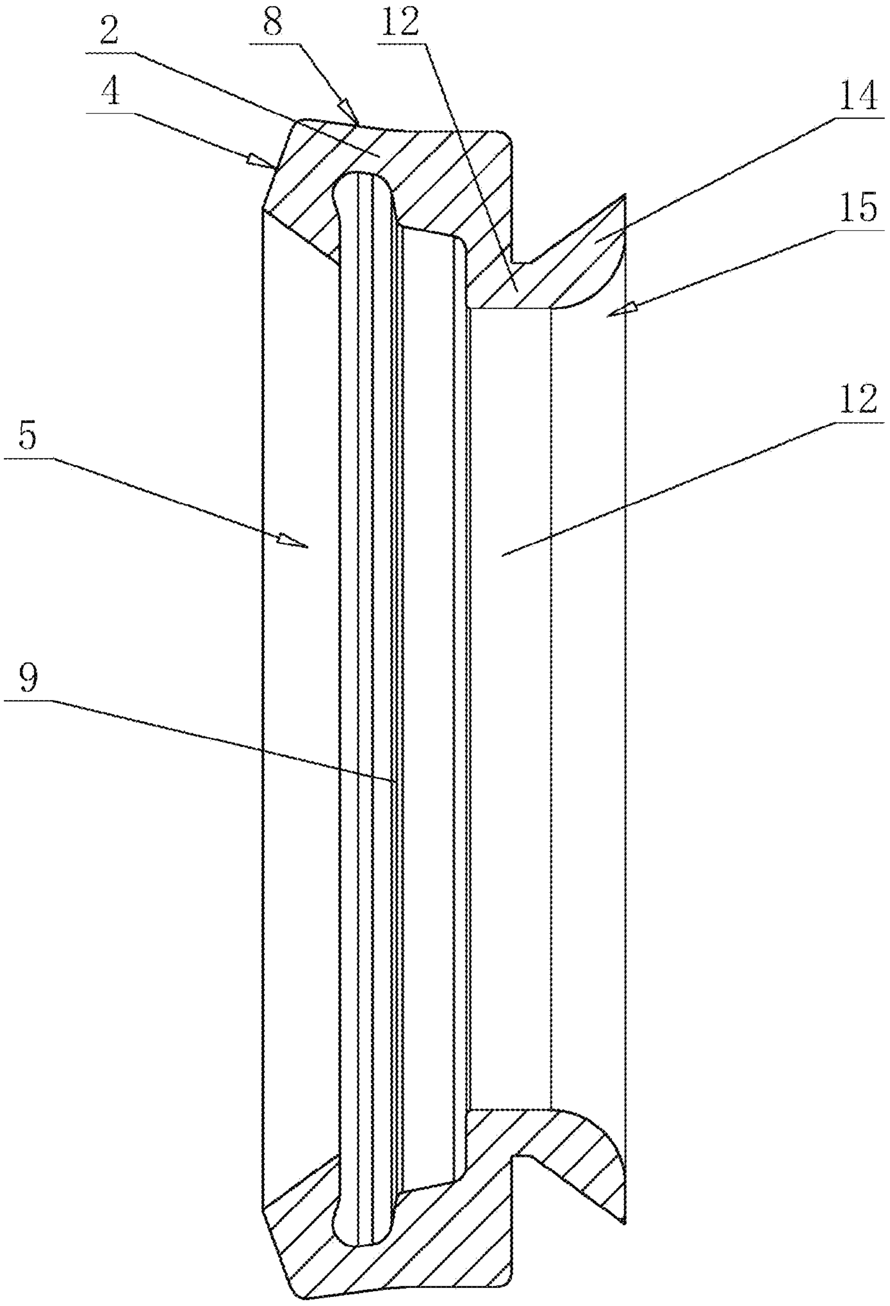
FIG. 14 is a cross-sectional view of the pipe fitting seal shown in FIG. 13.

Referring to FIGS. 13 and 14, a pipe fitting seal is different from the first embodiment in that an inner bias portion 12 is integrally formed on a side of the sealing ring 3 away from the connecting base 2, and the inner bias portion 12 is fixed in a direction away from the sealing ring 3. The inner bias portion 12 abuts against an inner wall of the pipe element, thereby increasing the contact area between the seal and the inner wall of the pipe element.

A deformable pressing ring 14 is integrally formed on one side of the inner biasing portion 12 away from the sealing ring 3, and an outer diameter of the deformable pressing ring 14 gradually increases in a direction away from the inner biasing portion 12. A transition arc surface 15 is formed on an inner wall of the deformable pressing ring 14, and an inner diameter of the deformable pressing ring 14 gradually increases in a direction away from the inner biasing portion 12.

The pipe fitting seal in the second embodiment can also be in the following forms.

Figure 15:
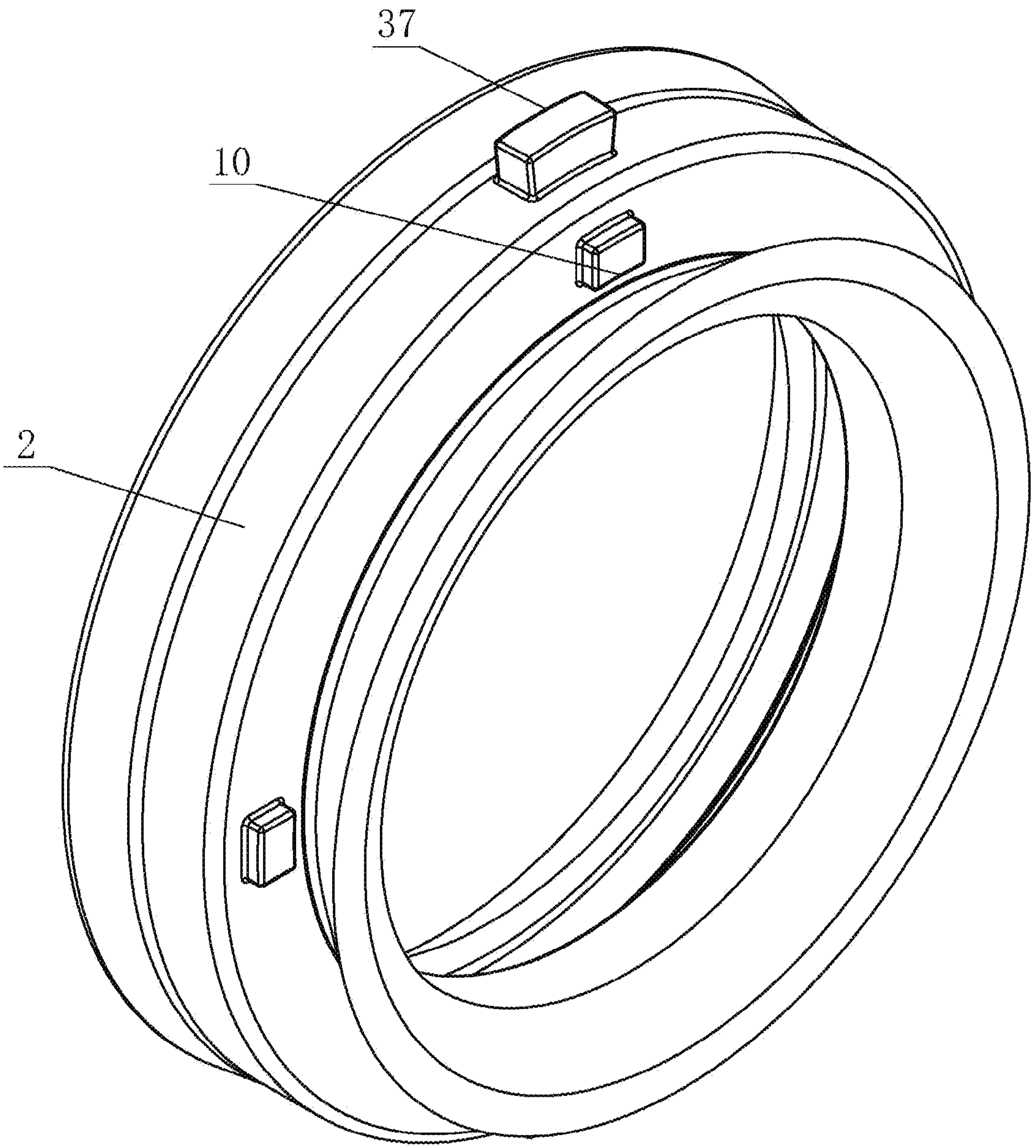
FIG. 15 is a schematic view of a pipe fitting seal according to a second example of the second embodiment of the present application.
Figure 16:
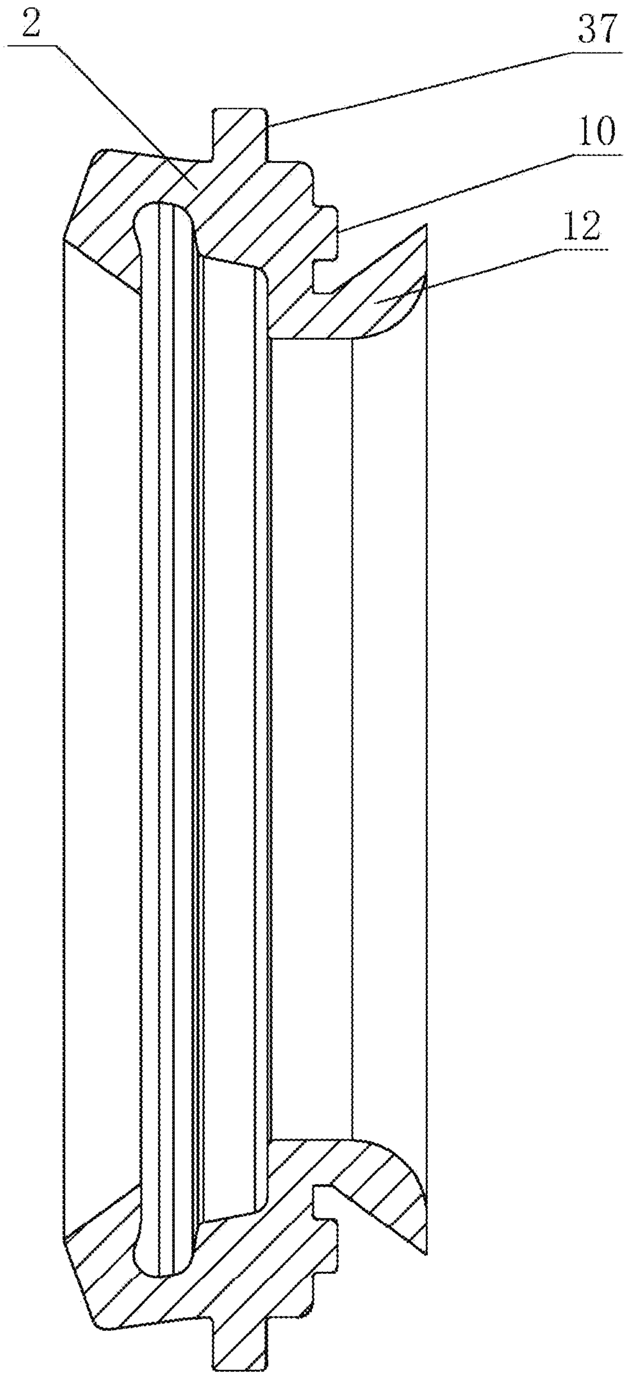
FIG. 16 is a cross-sectional view of the pipe fitting seal shown in FIG. 15.

As shown in FIGS. 15 and 16, the outer wall of the connecting base 2 is integrally formed with at least a support locking block 37, and the connecting base 2 is pressed against the support locking block 37, thereby ensuring the sealing performance of the entire seal.

At least a sealing pressing block 10 is integrally formed on a side of the sealing ring 3 away from the connecting base 2, and the supporting locking block 37 and the corresponding sealing pressing block 10 are in the same straight line at the abutting position.

Figure 17:
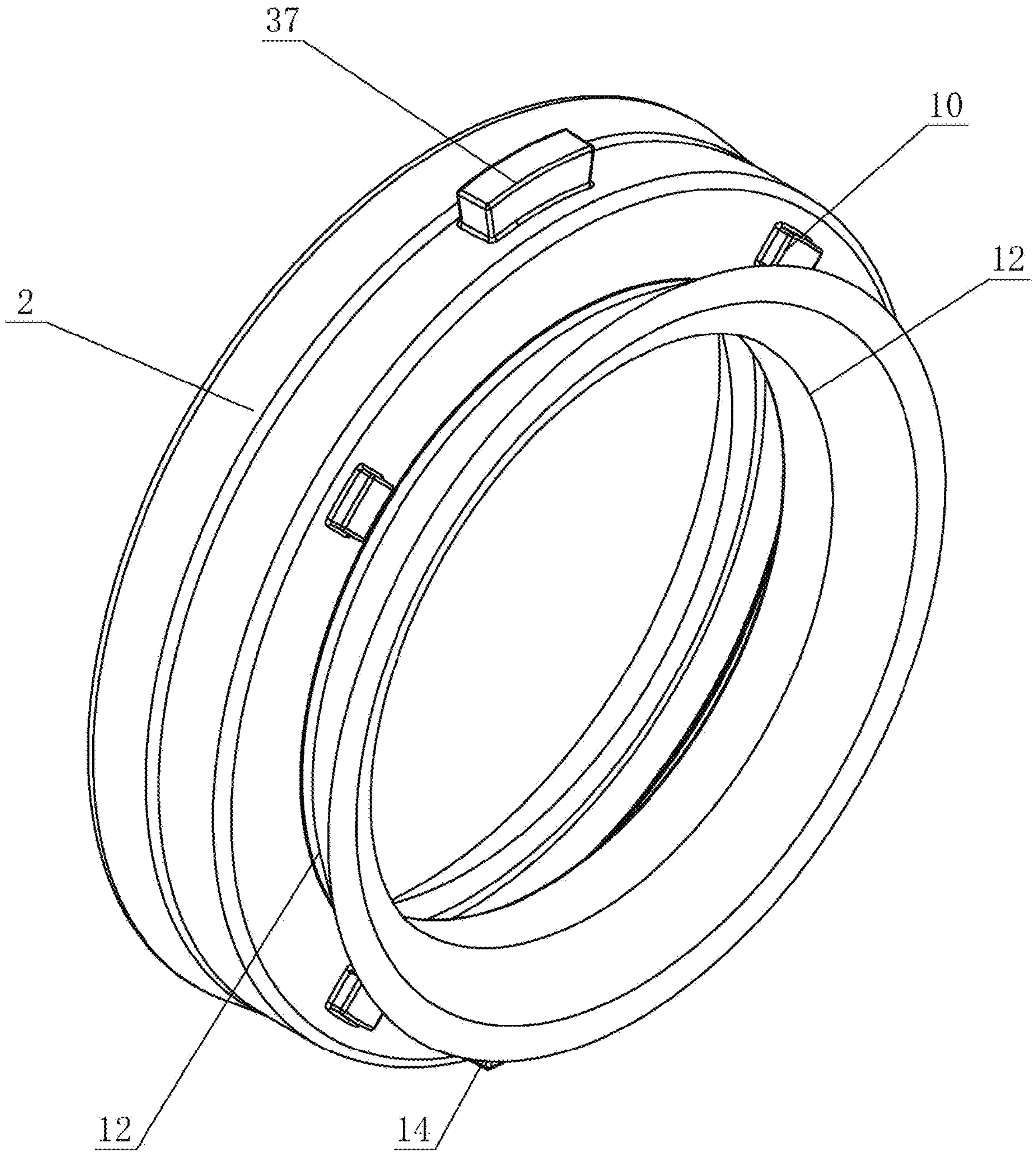
FIG. 17 is a schematic view of a pipe fitting seal according to a third example of the second embodiment of the present application.
Figure 18:
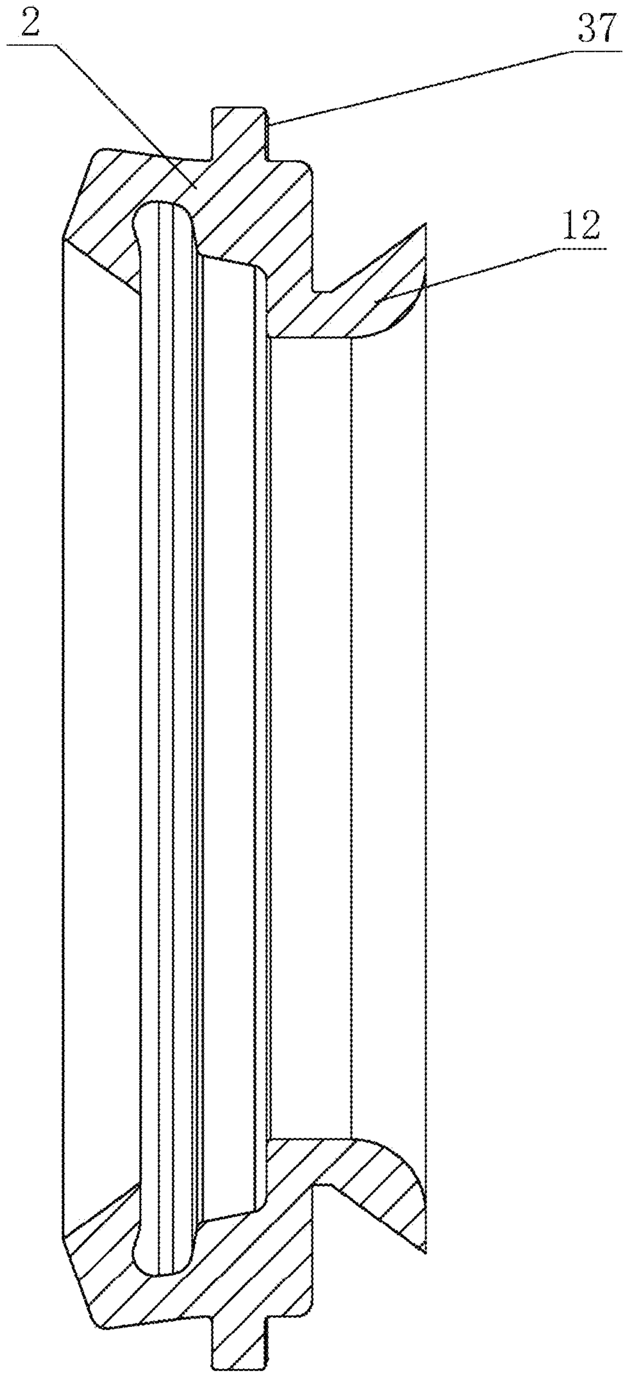
FIG. 18 is a cross-sectional view of the pipe fitting seal shown in FIG. 17.

As shown in FIGS. 17 and 18, the difference from the previous structure is that the support locking block 37 and the sealing pressing block 10 are staggered, and the support locking block 37 is located between two adjacent sealing pressing blocks 10, so that the connecting base 2 and the sealing ring 3 can be better squeezed to connect and ensure the sealing of the seal.

Figure 19:
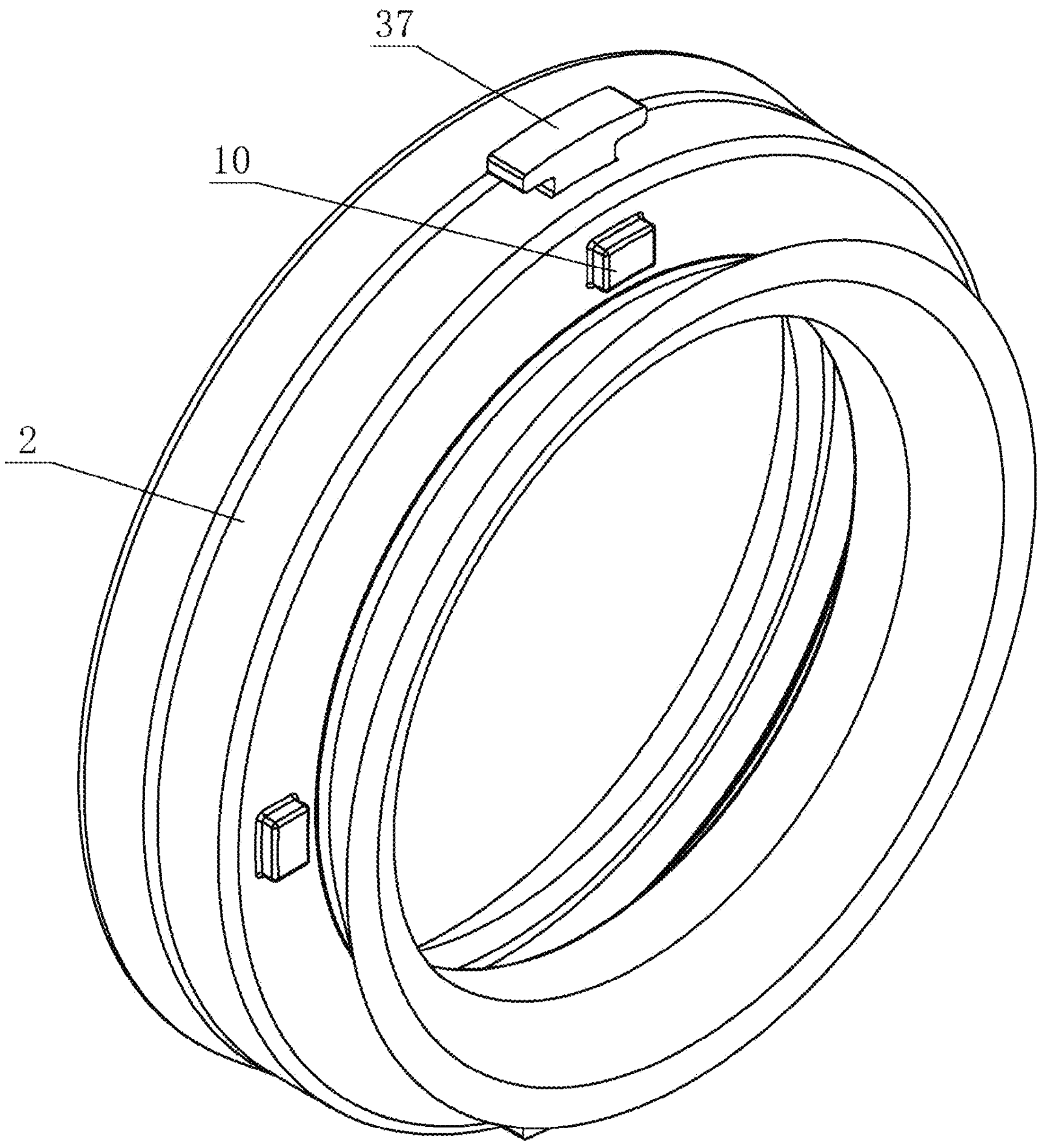
FIG. 19 is a schematic view of a pipe fitting seal according to a fourth example of the second embodiment of the present application.
Figure 20:
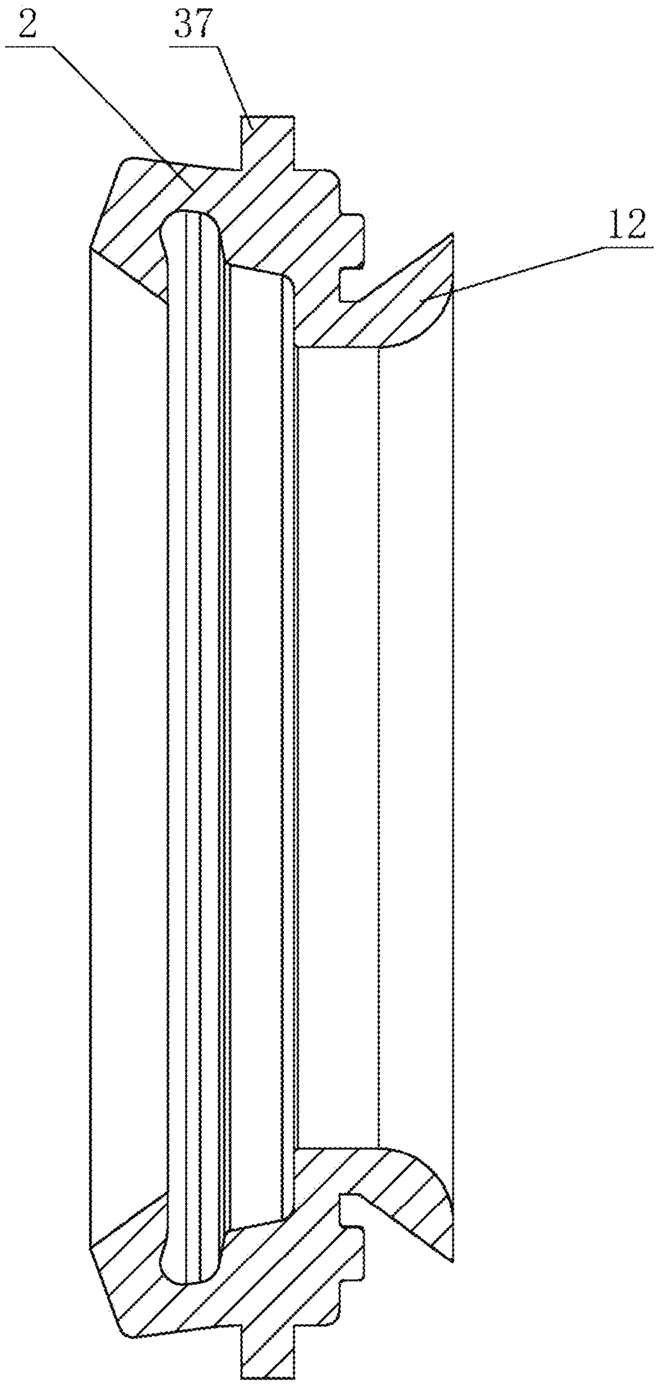
FIG. 20 is a cross-sectional view of the pipe fitting seal shown in FIG. 19.

As shown in FIGS. 19 and 20, the support locking block 37 is T-shaped, which can increase the support area of the support locking block 37 and the deformation of the support locking block 37 to better squeeze the connecting base 2 to produce deformation.

A limiting ring 13 is integrally formed on an outer wall of the inner biasing portion 12 and is plugged into and matched with the inner wall of the pipe element. The limiting ring 13 is a rectangular ring.

The position of the limiting ring 13 can be divided into the following two situations.

Figure 21:
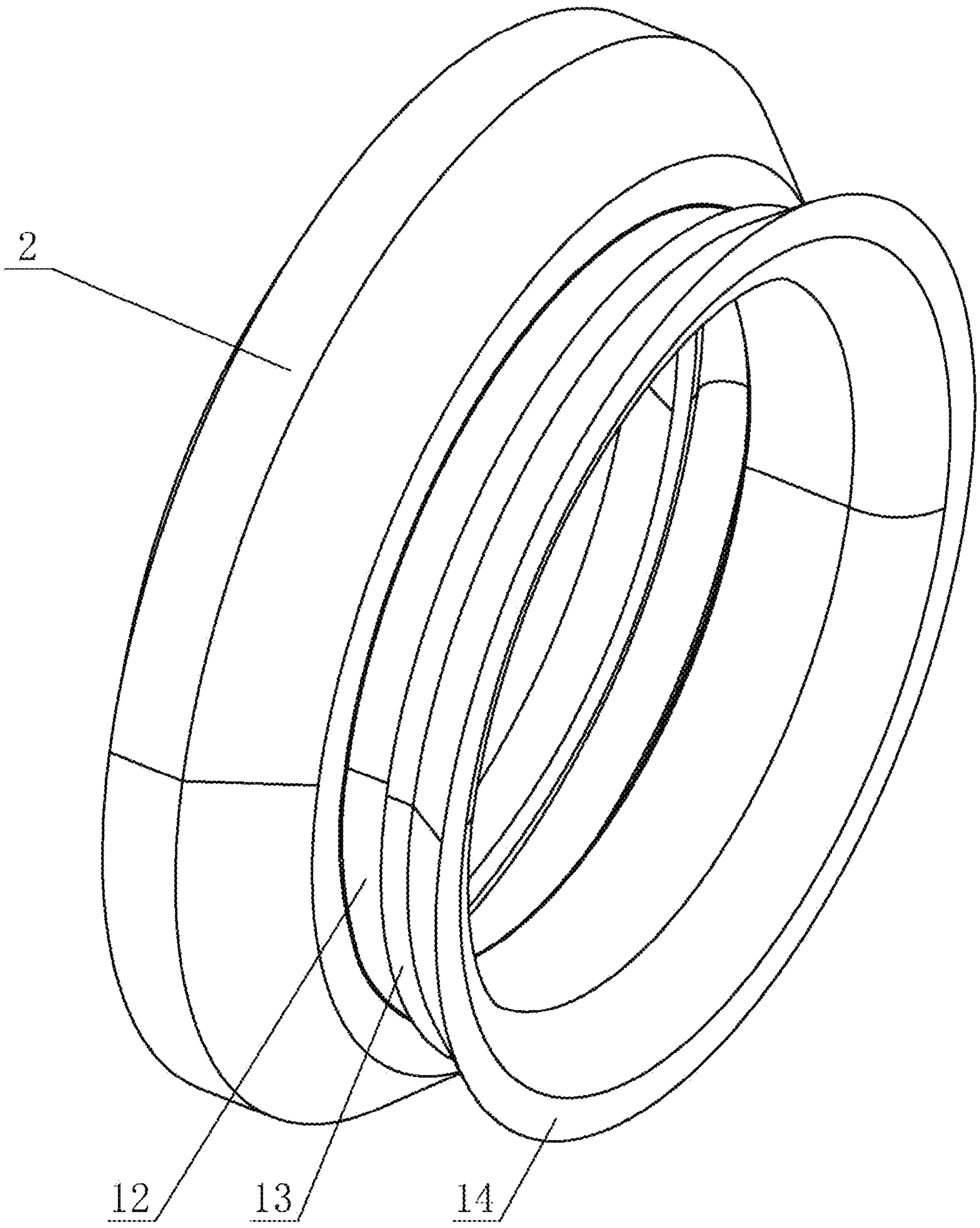
FIG. 21 is a schematic view of a pipe fitting seal according to a fifth example of the second embodiment of the present application.
Figure 22:
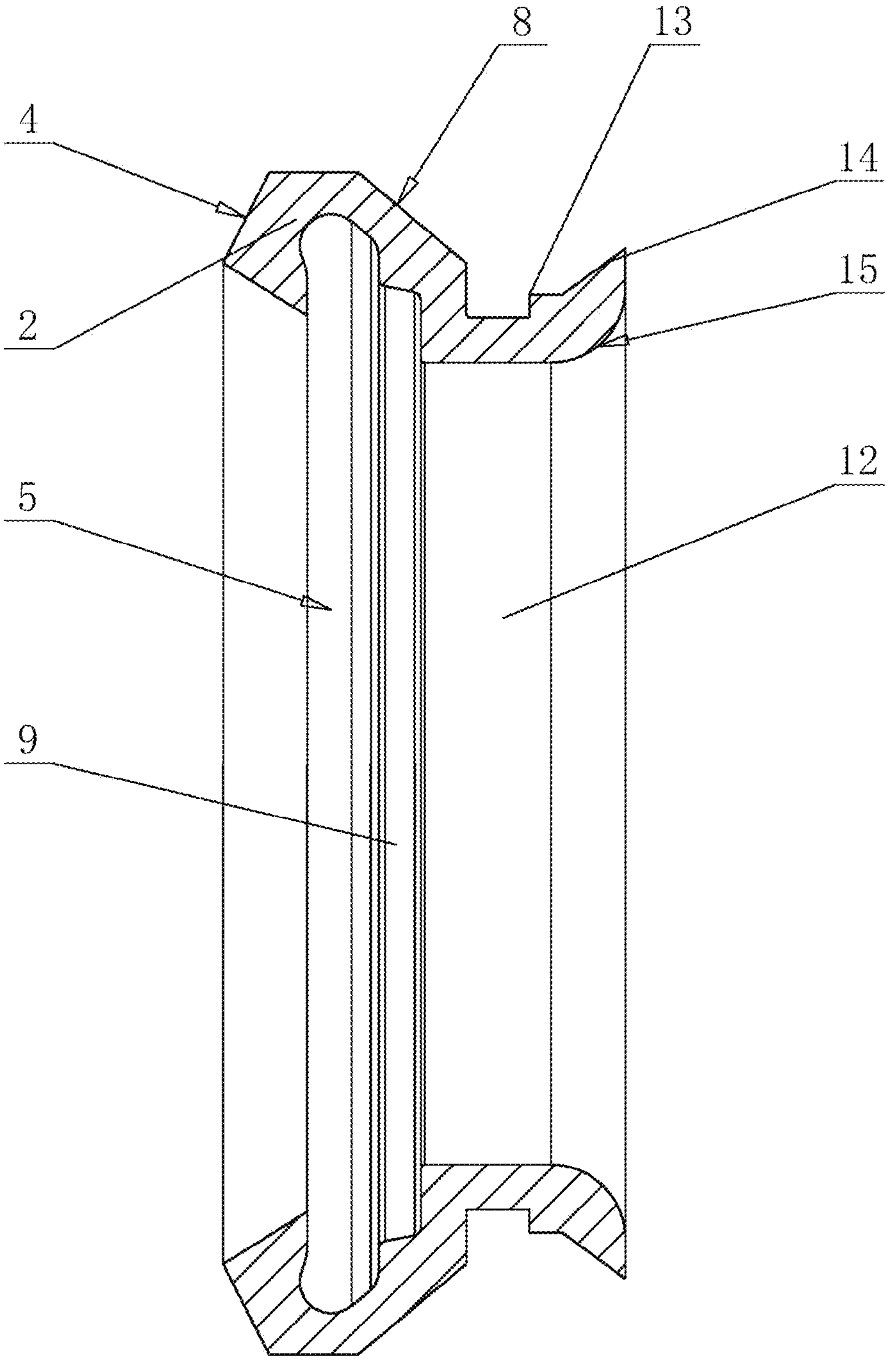
FIG. 22 is a cross-sectional view of the pipe fitting seal shown in FIG. 21.
Figure 23:
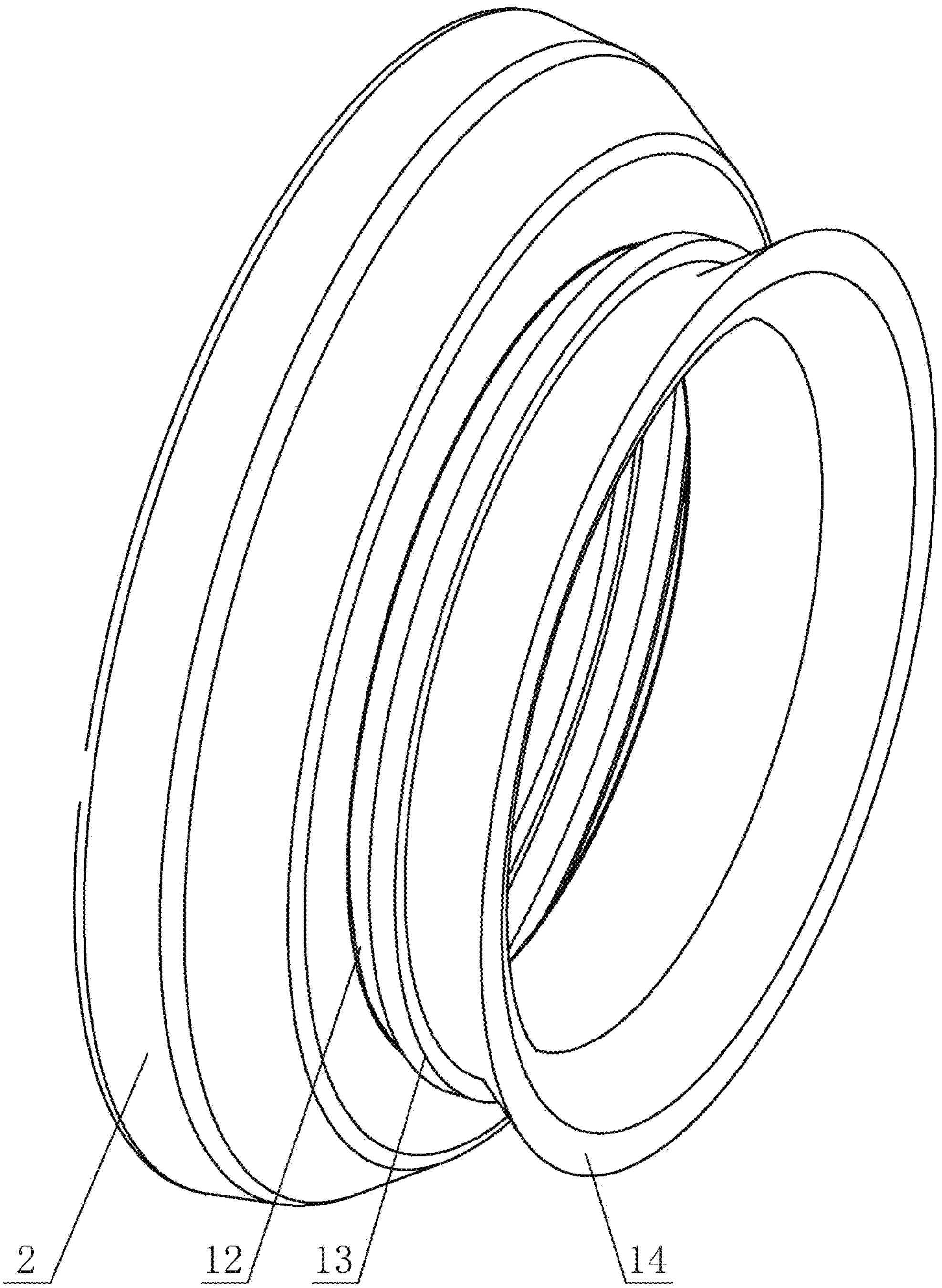
FIG. 23 is a schematic view of a pipe fitting seal according to a sixth example of the second embodiment of the present application.
Figure 24:
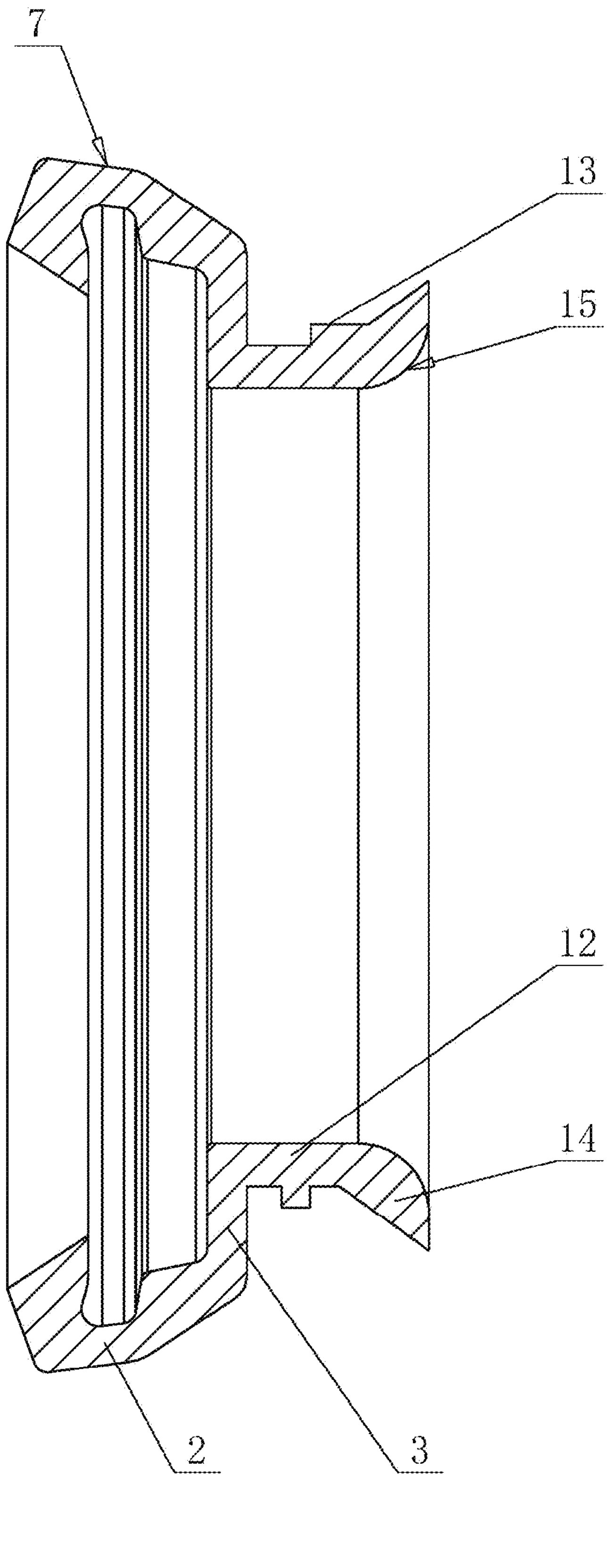
FIG. 24 is a cross-sectional view of the pipe fitting seal shown in FIG. 23.

Referring to FIGS. 21 and 22, as a first type, the limit ring 13 is set close to the deforming pressure ring 14. Compared with the example in FIGS. 13 and 14, this design can increase the pressure of the deforming pressure ring 14 to produce deformation, assist the deforming pressure ring 14 to press against the inner wall of the pipe element, reduce the warping phenomenon of the deforming pressure ring 14, and improve the stability of the seal. As shown in FIGS. 23 and 24, the first abutting surface 7 is arranged to be straight, and the resulting edges and corners are more convenient for the connecting base 2 to bear the force, thereby improving the convenience by adopting the connecting base 2.

Figure 25:
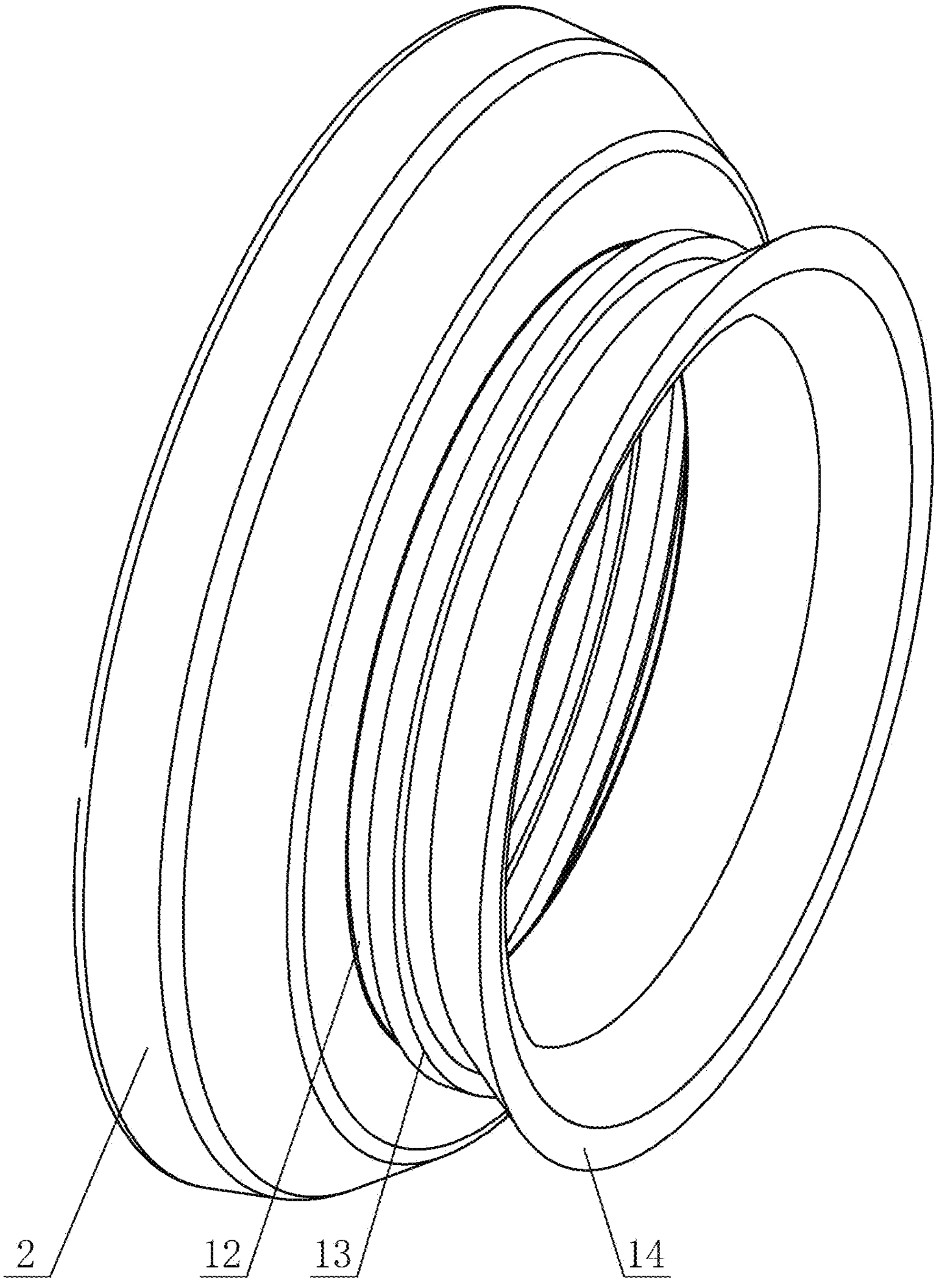
FIG. 25 is a schematic view of a pipe fitting seal according to a seventh example of the second embodiment of the present application.
Figure 26:
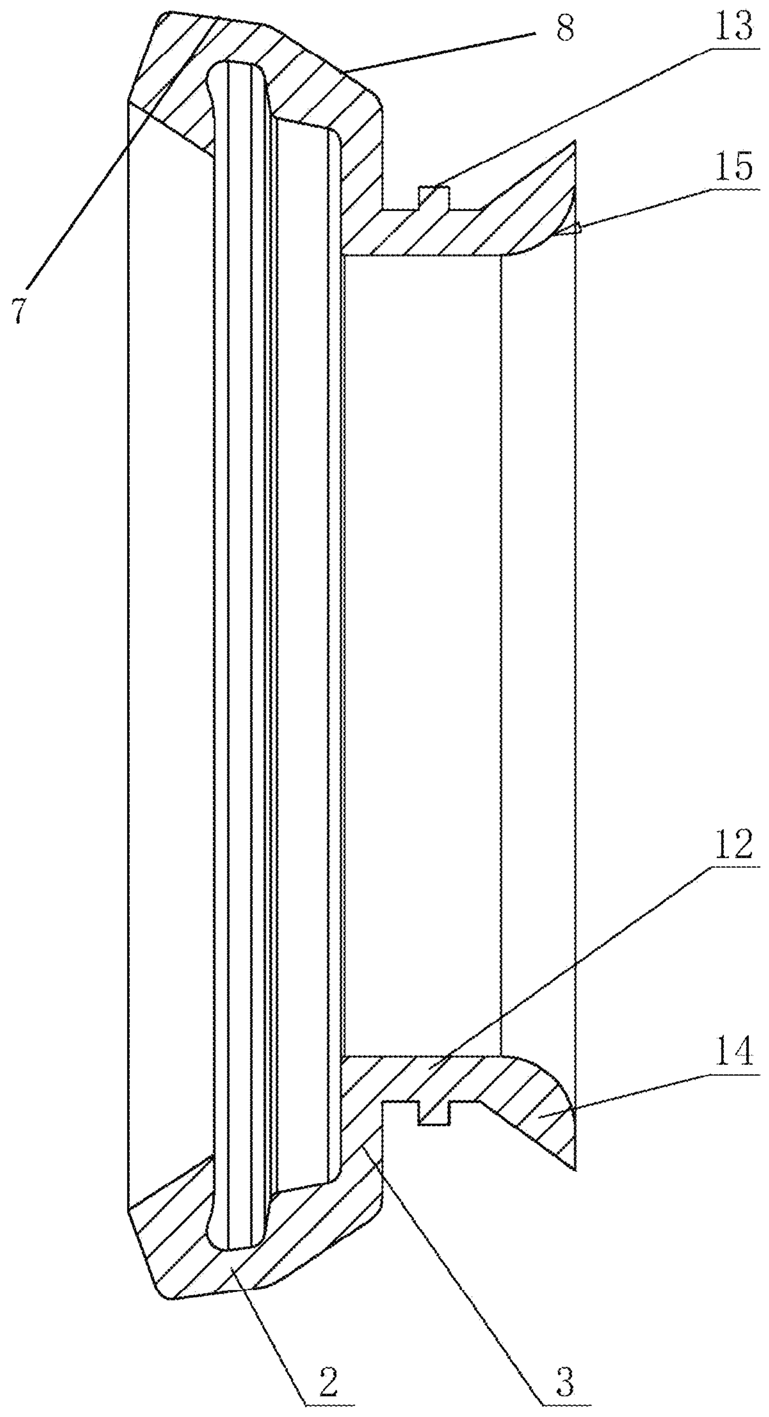
FIG. 26 is a cross-sectional view of the pipe fitting seal shown in FIG. 25.
Figure 27:
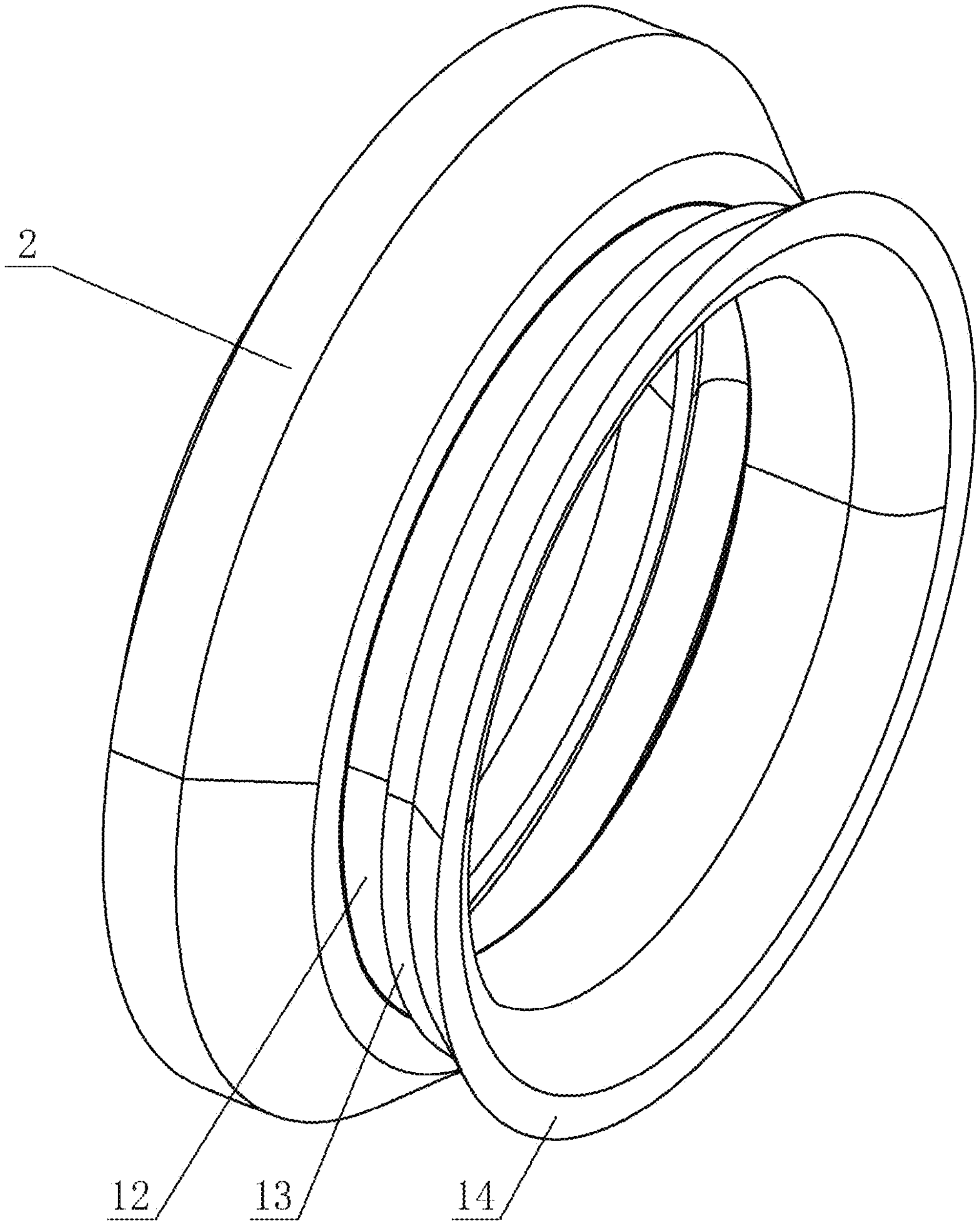
FIG. 27 is a schematic view of a pipe fitting seal according to a eighth example of the second embodiment of the present application.
Figure 28:
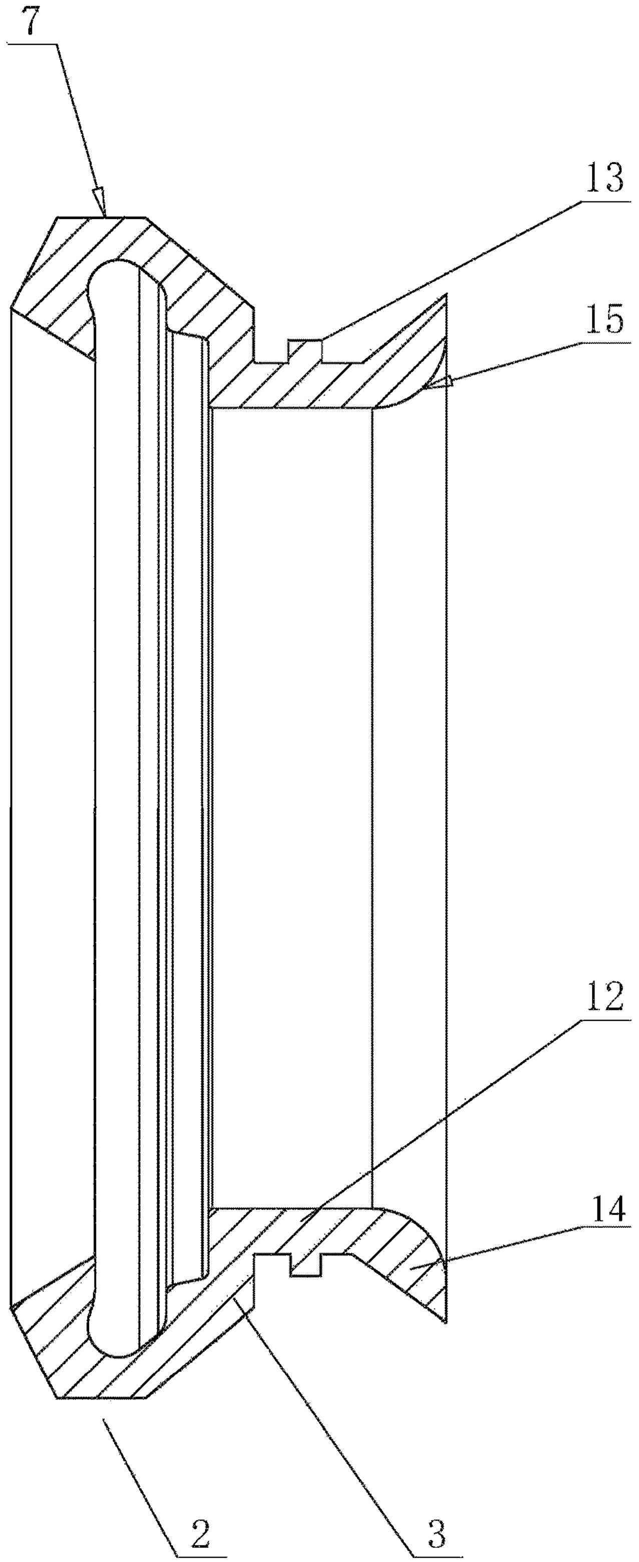
FIG. 28 is a cross-sectional view of the pipe fitting seal shown in FIG. 27.

As shown in FIGS. 27 and 28, as a second type, the limiting ring 13 is arranged at a position between the sealing ring 3 and the deformable pressing ring 14. With such a design, when the seal is installed, the contact surface with the pipe element can be increased, and the movement of the inner biasing portion 12 can be reduced, thereby improving the stability of adopting the inner biasing portion 12. As shown in FIGS. 25 and 26, the first abutting surface 7 is inclined, and its outer diameter gradually decreases in the direction approaching the sealing ring 3, so that it can be connected to the third abutting inclined surface 8 more smoothly.

Figure 31:
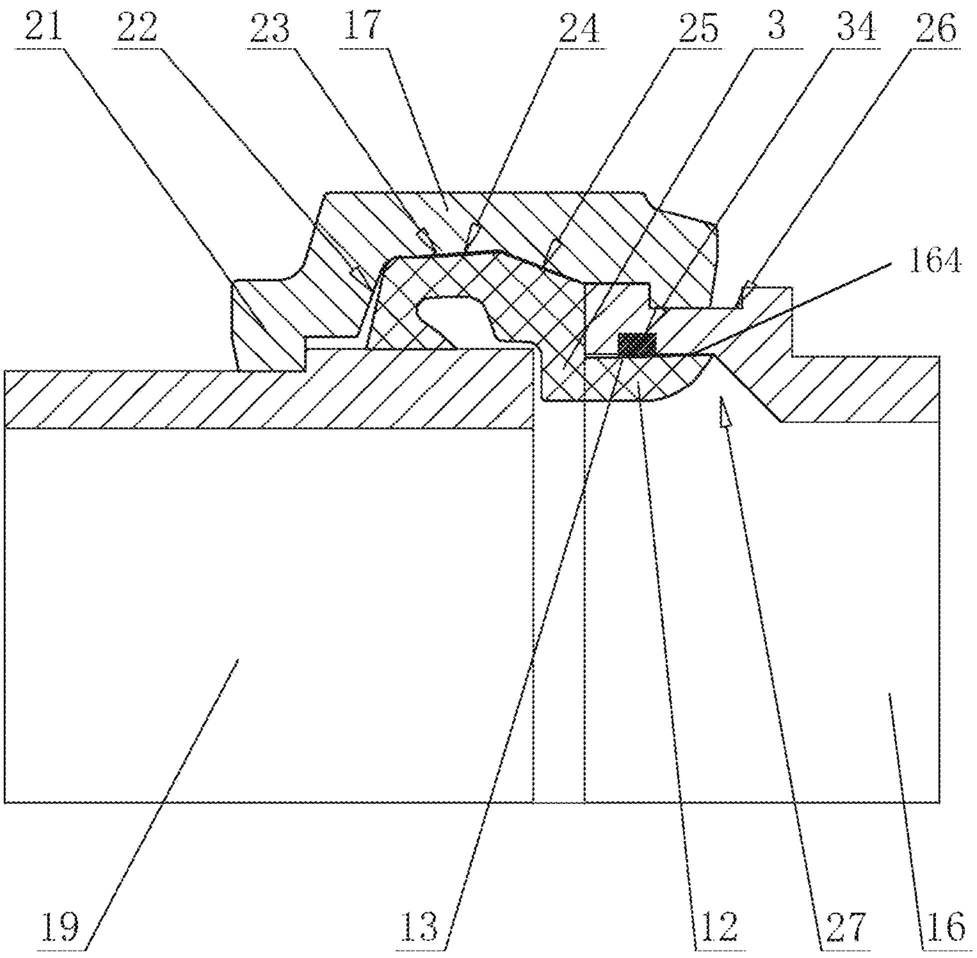
FIG. 31 is a cross-sectional view of a pipe connecting structure according to a first example of the second embodiment of the present application.

Referring to FIG. 31, a pipe connecting structure is different from the first embodiment in that a drag reduction ring groove 27 which is engaged with the inner biasing portion 12 is formed on the inner wall of the second pipe element 16, and the drag reduction ring groove 27 is designed in a circular ring shape, so as to reduce the impact of the fluid in the second pipe element 16 on the inner biasing portion 12, and to reduce the warping of the deformable pressing ring 14 and improve the stability of the seal. A limiting slot 34 is provided in the drag reduction ring groove 27 and is engaged with the limiting ring 13. With such a design, the inner biasing portion 12 can be fixed more stably.

The installation forms of the movable holding members 17 in the second embodiment of the present application also include the following two forms.

Figure 32:
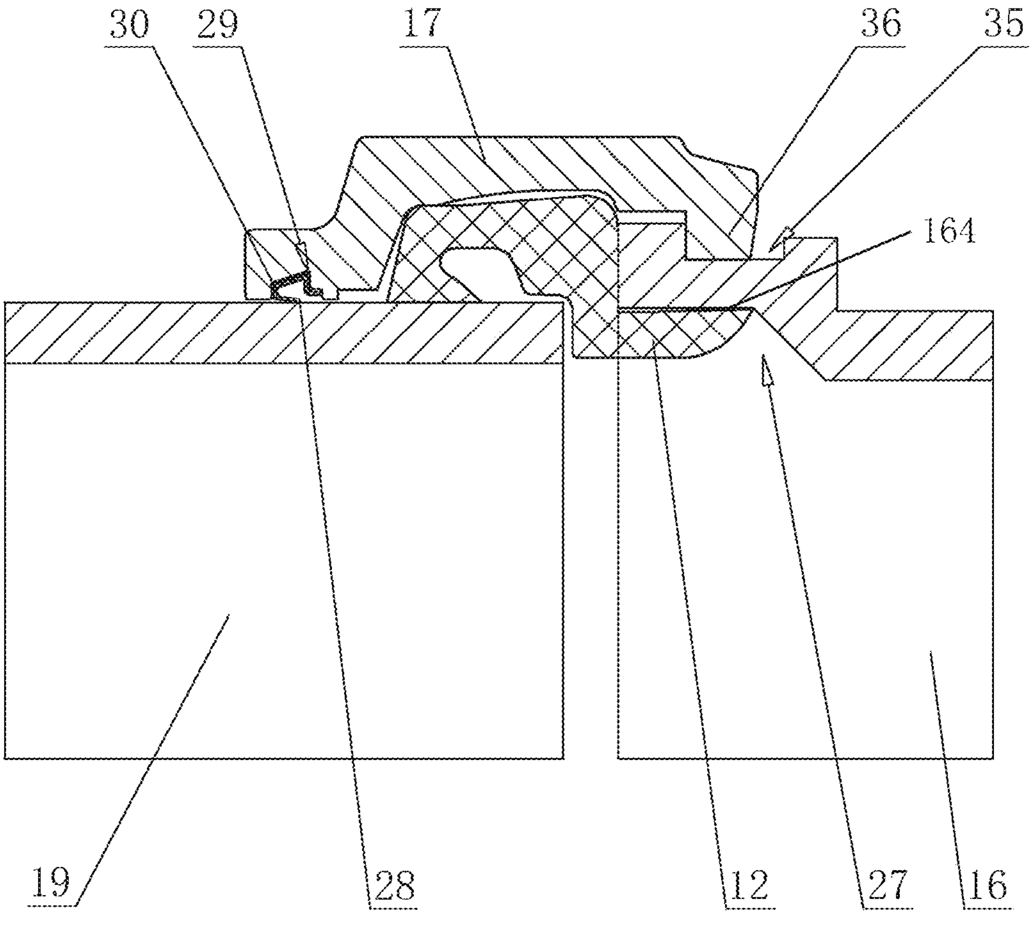
FIG. 32 is a cross-sectional view of a pipe connecting structure according to a second example of the second embodiment of the present application.

Referring to FIGS. 32, as a first form, a limiting plug ring 36 is integrally formed on one side of each movable clamping member 17, and the limiting plug ring 36 is in an ring shape. A plug-in ring groove 35 for plugging with the limiting plug ring 36 is formed on the outer wall of the second pipe element 16, a limiting installation groove 29 is formed on the other side of the corresponding movable clamping member 17. A clamp engaging ring 30 is fixed in the limiting installation groove 29, and a plurality of clamping rings 28 are integrally formed on a side of the clamp engaging ring 30 away from the corresponding movable clamping member 17. The clamp engaging ring 30 is V-shaped, which can make the clamp engaging ring 30 have a certain elasticity, so that the clamping rings 28 can be more firmly pressed against the outer wall of the first pipe element 19, thereby improving the firmness of the connection with the first pipe element 19.

Figure 33:
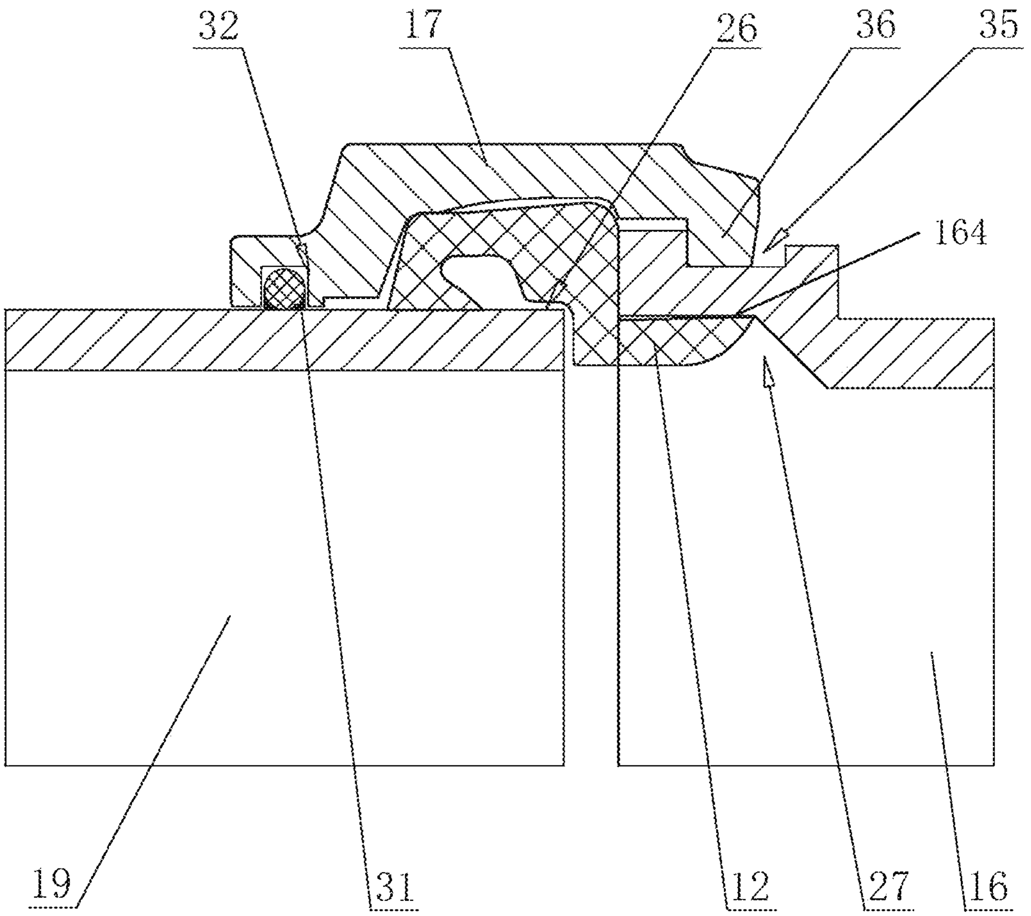
FIG. 33 is a cross-sectional view of a pipe connecting structure according to a third example of the second embodiment of the present application.

Referring to FIG. 33, as a second form, a limiting plug ring 36 is fixed on one side of the corresponding movable clamping member 17, and a plug-in ring groove 35 which is engaged with the limiting plug ring 36 is formed on the outer wall of the second pipe element 16. A limiting clamping groove 32 is formed on the other side of the corresponding movable clamping member 17, and a limiting clamp 31 is welded and fixed on the outer wall of the first pipe element 19. The cross-section of the limiting clamp 31 is cylindrical, and the limiting clamp 31 is plugged into and cooperated with the limiting clamp 28, so that the first pipe element 19 can be fixed more stably, thereby improving the firmness of the connection between the first pipe element 19 and the second pipe element 16.

The inner biasing portion 12 in the second embodiment can be better adapted to different elbows and improve the sealing performance of the seal, wherein the second pipe elements 16 are can be 45-degree elbow, 90-degree elbow, reducer, straight tee, and straight cross. Such a design can better ensure the sealing performance of the connection between the seal and the pipeline.

Different from the first embodiment, the implementation principle of the second embodiment is that the inner biasing portion 12 cooperates with the deformable pressing ring 14 to increase the contact with the inner wall of the pipe element and improve the sealing effect to the pipe element. Combined with a variety of connection methods, it can be applicable to various forms of pipe elements, thereby improving the convenience of pipe fitting connection and sealing installation.

Embodiment 3

Figure 3:
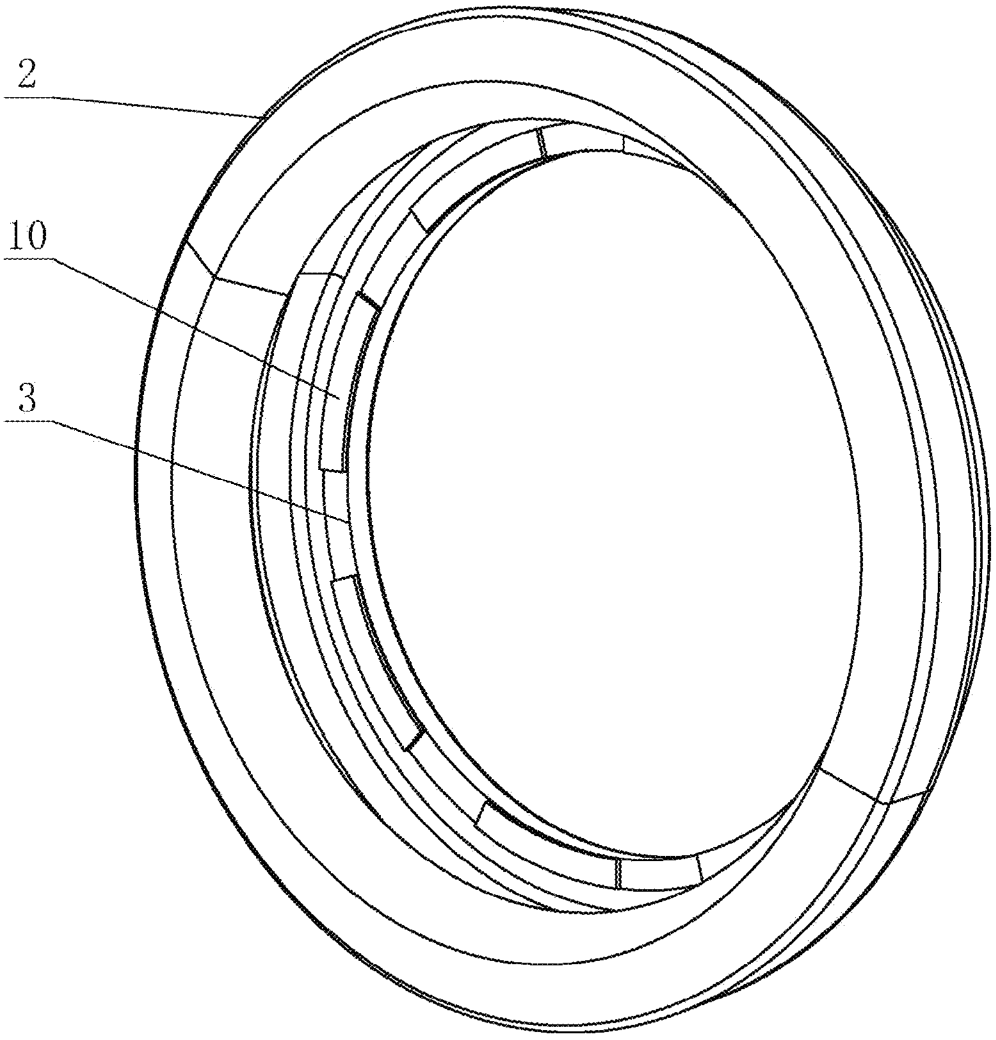
FIG. 3 is a schematic view of a pipe fitting seal according to a first example of a third embodiment of the present application.
Figure 4:
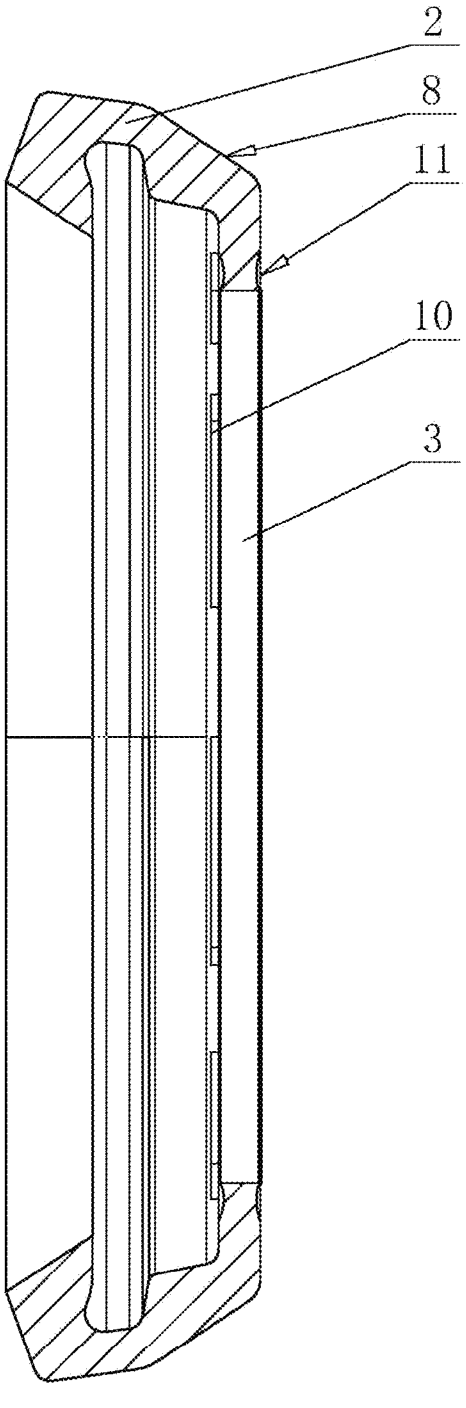
FIG. 4 is a cross-sectional view of the pipe fitting seal shown in FIG. 3.

As shown in FIGS. 3 and 4, a pipe fitting seal is shown and is different from the first embodiment in that both sides of the sealing ring 3 can be provided with abutting arc surfaces 11 that are adapted for abutting against the pipe element, and the pipe elements are adapted for plug fitting with the abutting sliding surfaces respectively. A plurality of sealing pressing blocks 10 are integrally formed on one side of the sealing ring 3 adjacent to the outer biasing portion 1.

The pipe fitting seal in this third embodiment can also adopt the following forms.

Figure 5:
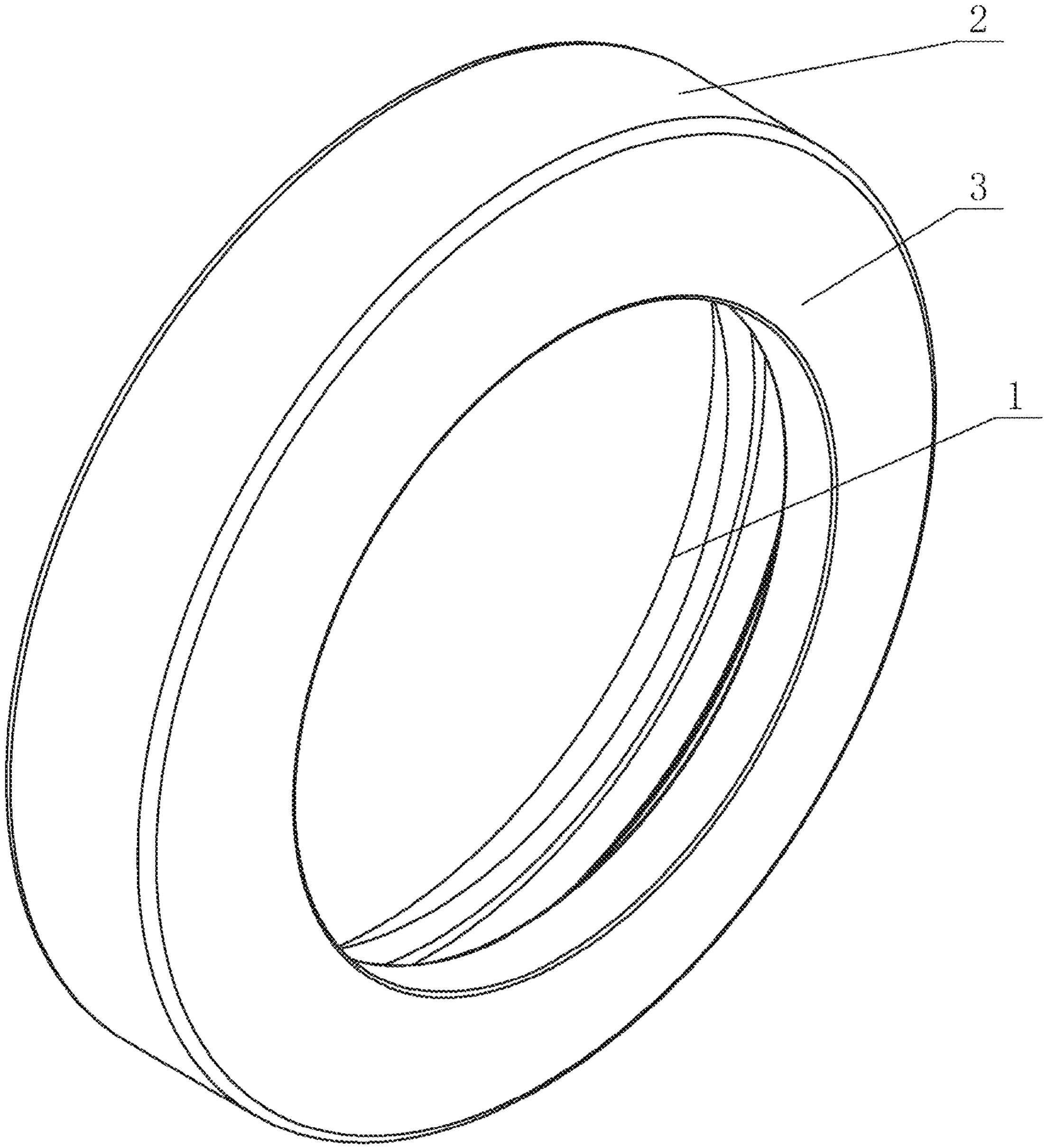
FIG. 5 is a schematic view of a pipe fitting seal according to a second example of the third embodiment of the present application.
Figure 6:
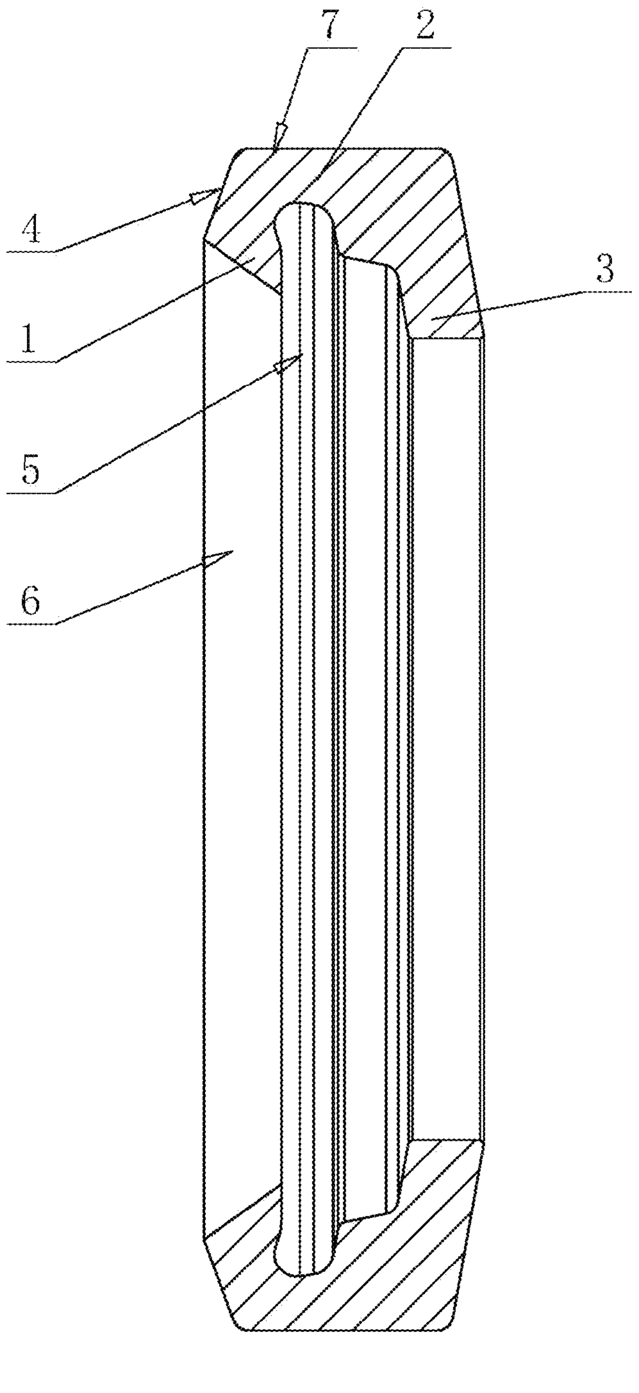
FIG. 6 is a cross-sectional view of the pipe fitting seal shown in FIG. 5.

As shown in FIGS. 5 and 6, one side of the sealing ring 3 is smoothly transitioned and connected to the first abutting surface 7 on the connecting base 2, so as to reduce the use of the third abutting inclined surface 8 and can increase the strength of the overall structure.

Figure 7:
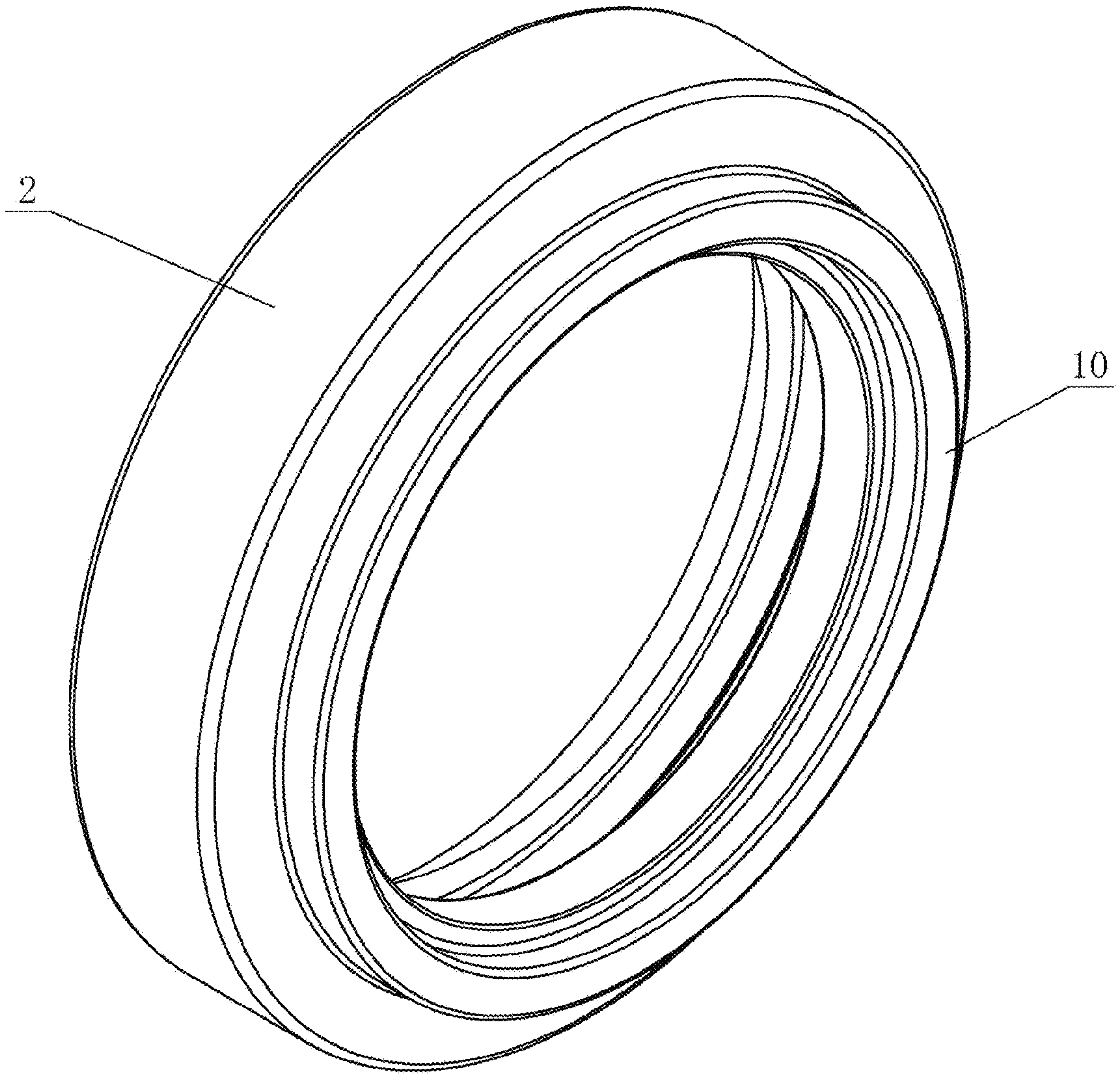
FIG. 7 is a schematic view of a pipe fitting seal according to a third example of the third embodiment of the present application.
Figure 8:
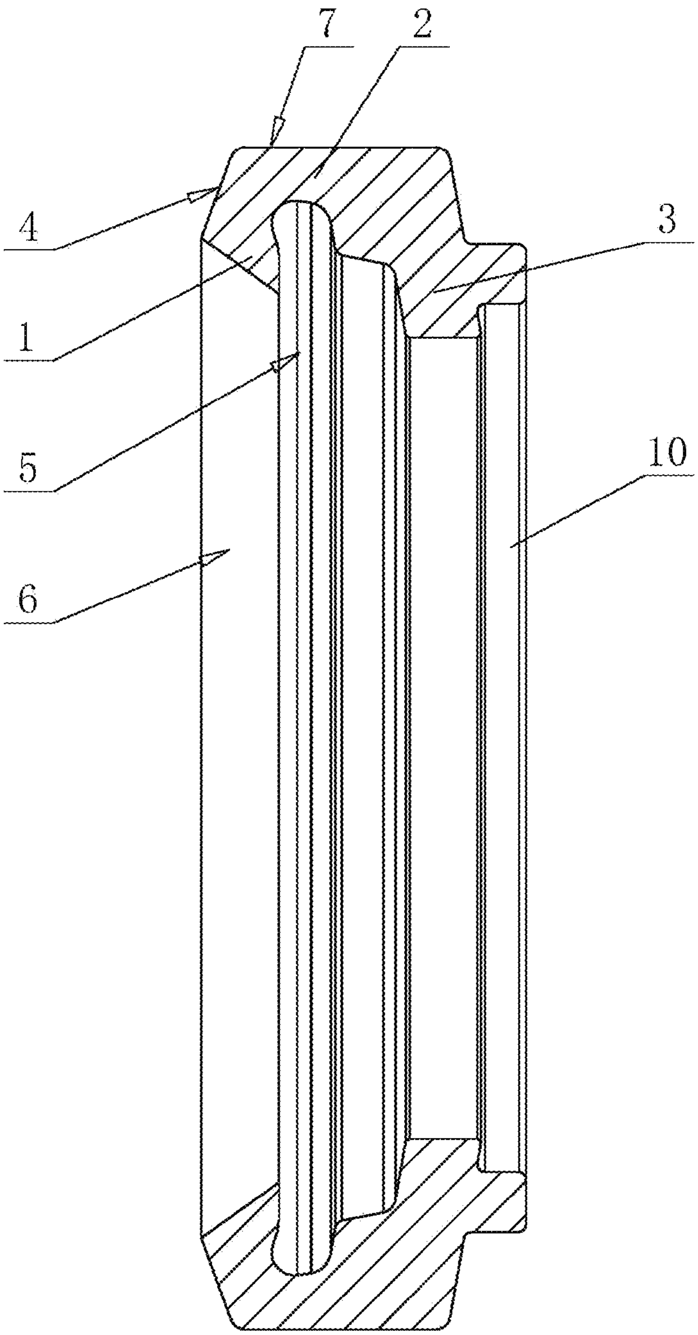
FIG. 8 is a cross-sectional view of the pipe fitting seal shown in FIG. 7.

As shown in FIGS. 7 and 8, the sealing pressing block 10 is integrally formed on a side of the sealing ring 3 away from the connecting base 2. The sealing clamping ring 10 is annular, so that the sealing ring 3 can be better abutted and the sealing performance of the sealing ring 3 is improved.

Figure 9:
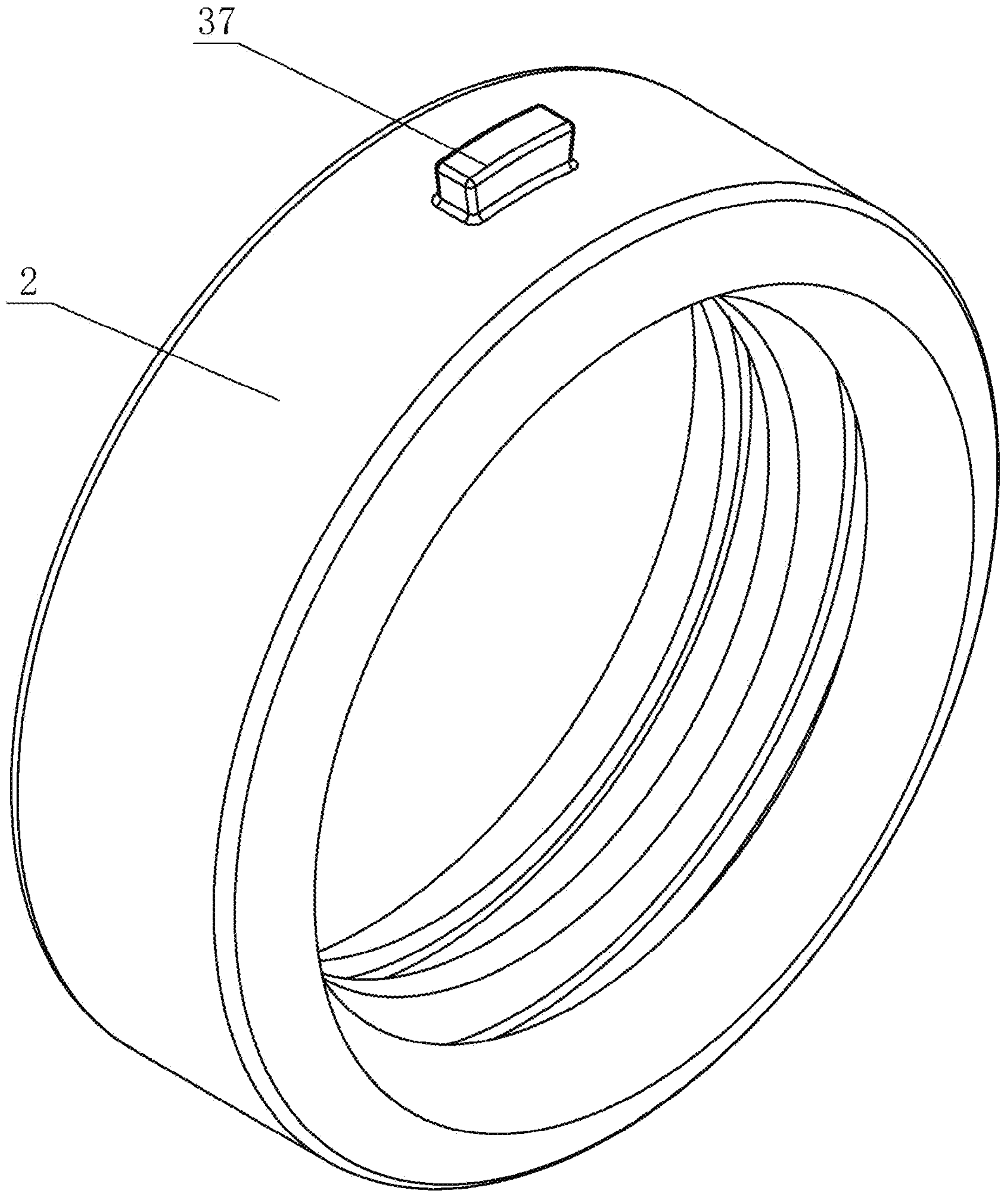
FIG. 9 is a schematic view of a pipe fitting seal according to a fourth example of the third embodiment of the present application.
Figure 10:
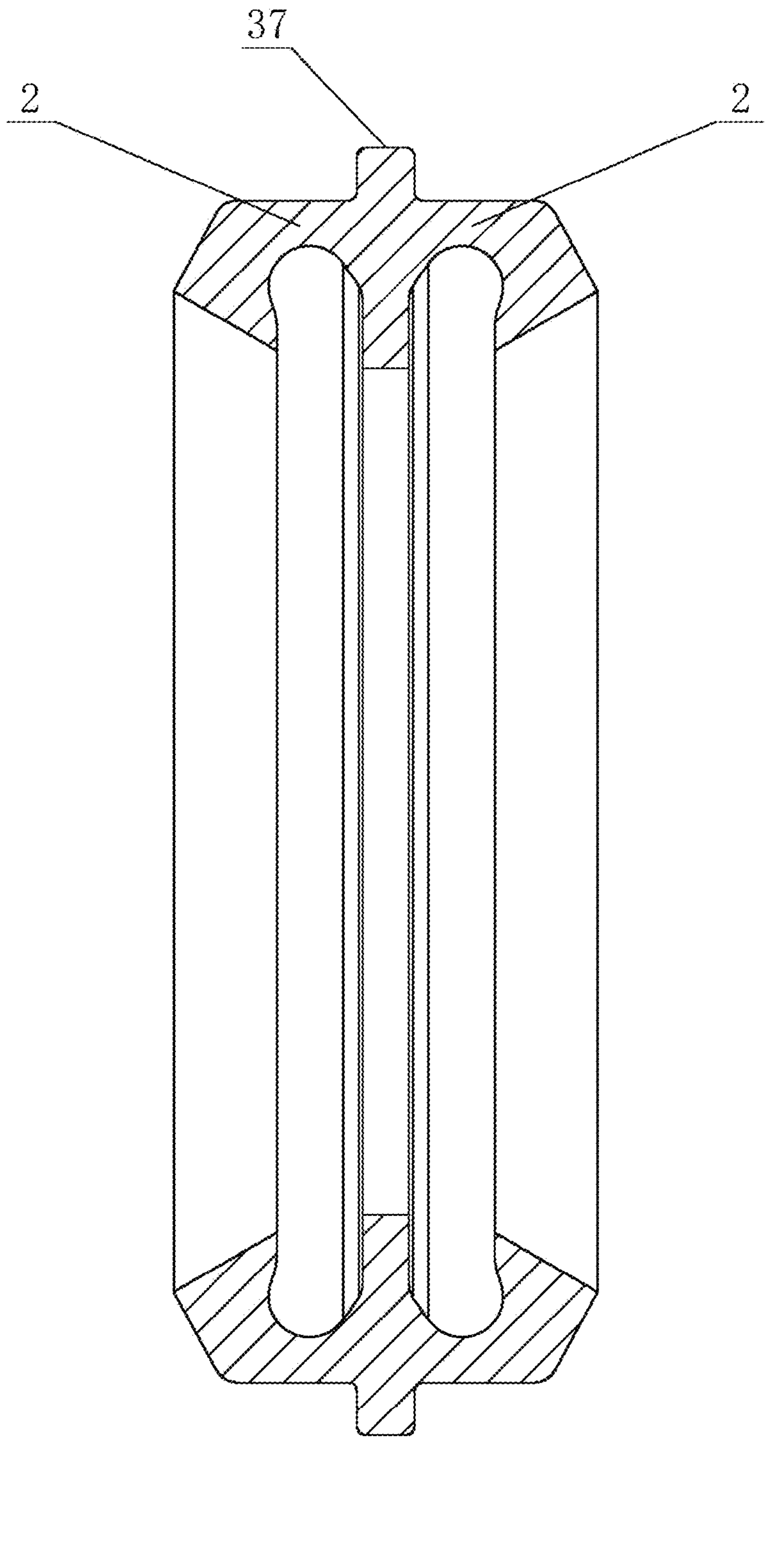
FIG. 10 is a cross-sectional view of the pipe fitting seal shown in FIG. 9.

As shown in FIGS. 9 and 10, two connecting bases 2 are symmetrically arranged on both sides of the sealing ring 3, so that the sealing member can abut against both pipe elements to ensure the sealing effect of the seal. The support locking block 37 is integrally formed on the outer wall of the connecting base 2. The support locking block 37 can enable the seal to be more firmly pressed against the pipe element, thereby ensuring the sealing of the connection between the two pipe elements.

Figure 11:
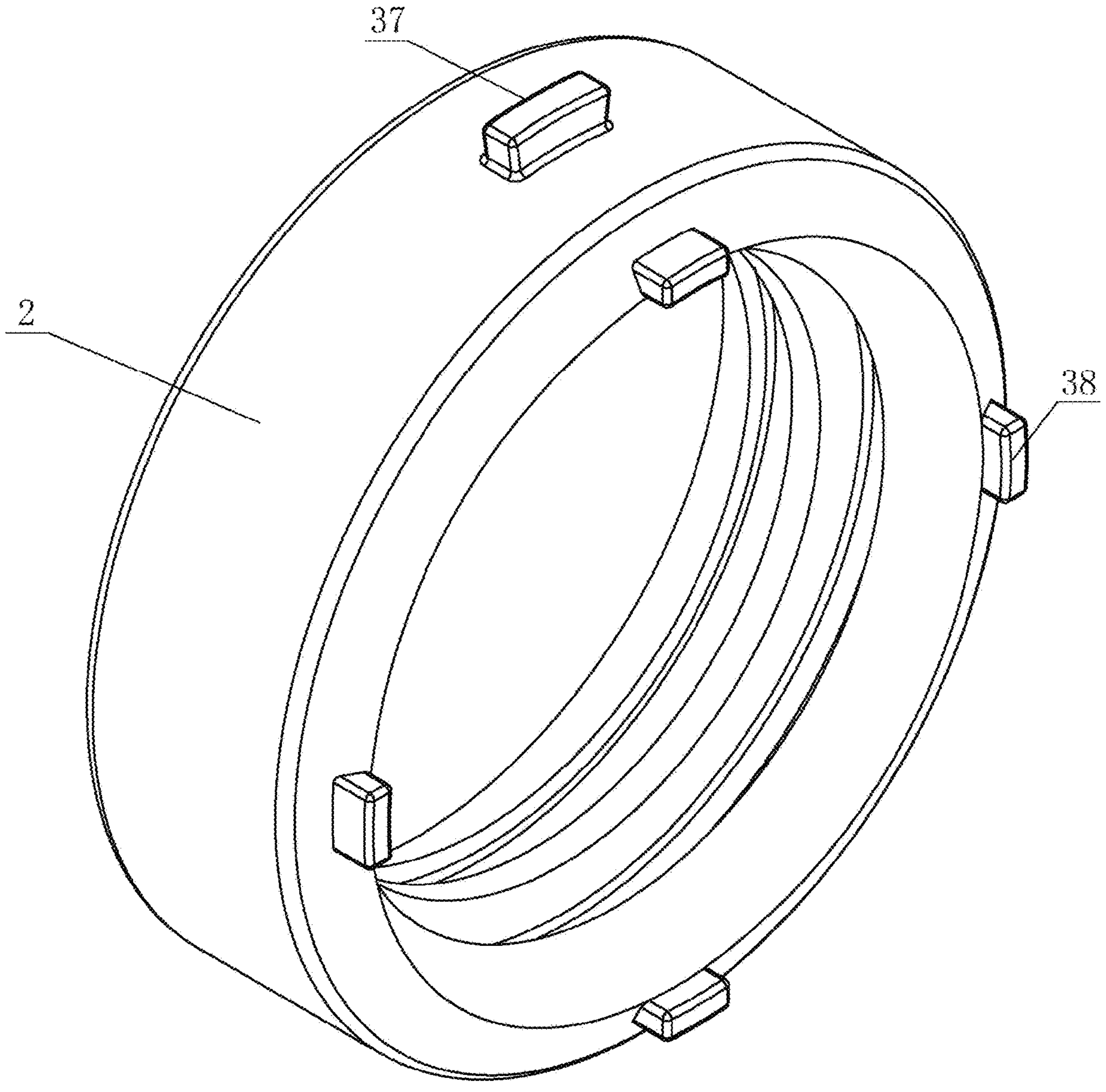
FIG. 11 is a schematic view of a pipe fitting seal according to a fifth example of the third embodiment of the present application.
Figure 12:
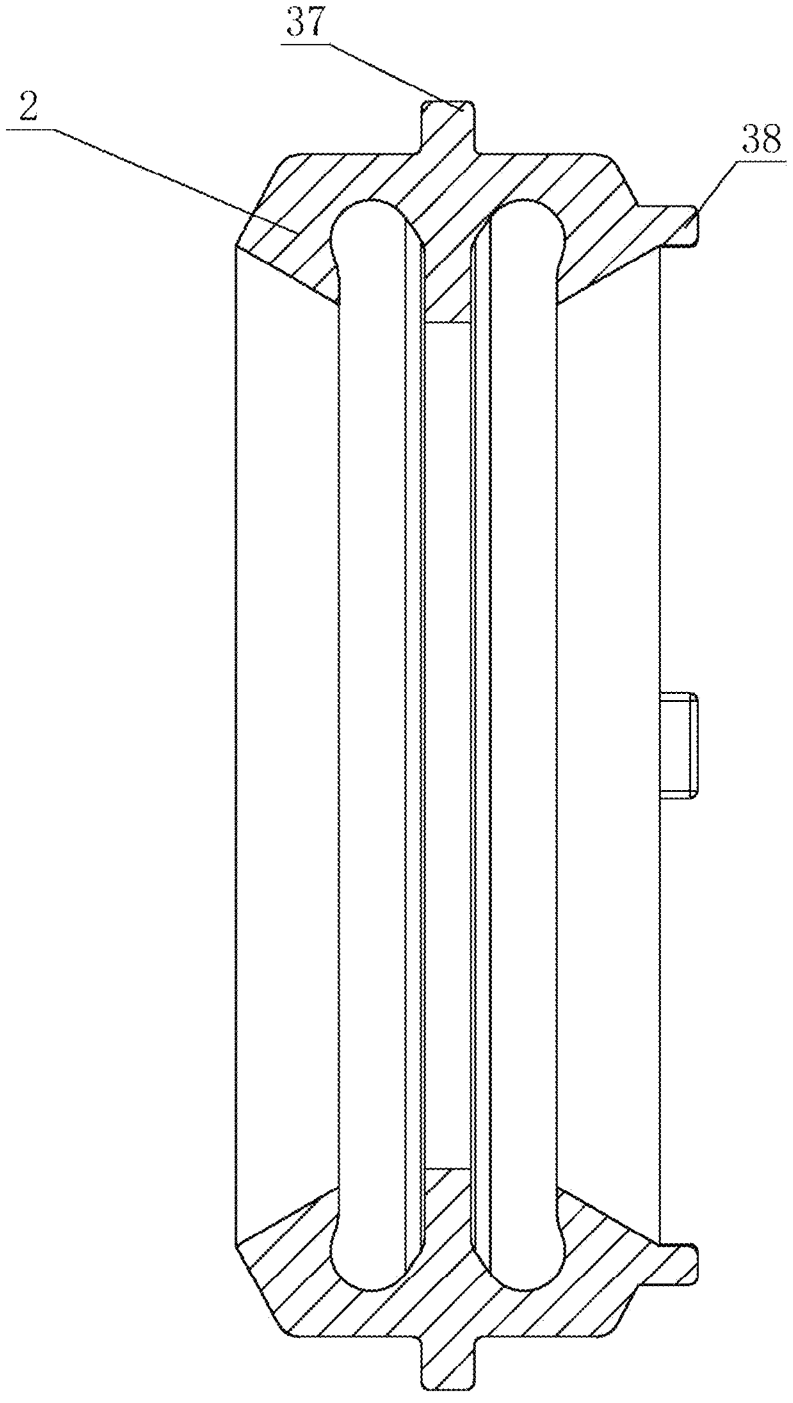
FIG. 12 is a cross-sectional view of the pipe fitting seal shown in FIG. 11.

As shown in FIGS. 11 and 12, on the basis of the above, a side support pressing block 38 is integrally formed on one side of the connecting base 2, thereby increasing the deformation of the connecting base 2 and improving the sealing performance of the seal.

The implementation principle of the second embodiment is that by squeezing the sealing pressing block 10, after the two pipe elements are fixed in position, the sealing pressing block 10 can push the sealing ring 3 against the pipe element to improve the sealing between the sealing ring 3 and the pipe element.

With reference to FIGS. 1 to 2 and 29 to 30, the first pipe element 19 comprises a first connecting end portion 191 having an end wall 192 and an outer wall 193, the second pipe element 16 comprises a second connecting end portion 161 having an end wall 162 and an outer wall 163. The pipe fitting seal can be arranged between the first connecting end portion 191 and the second connecting end portion 161.

More specifically, the pipe fitting seal, which is made of rubber material, comprises the sealing ring 3, the connecting base 2 integrally extended from the sealing ring 3 and the outer biasing portion 1 inwardly extended from the connecting base 2 for biasing against the outer wall 193 of the first connecting end portion 191 of the first pipe element 19.

The sealing ring 3 comprises a first stopping surface 301 and a second stopping surface 302 at two sides thereof, the two side stopping surfaces 301 and 302 are respectively arranged to bias against the end wall 192 of the first pipe element 19 and the end wall 162 of the second pipe element 16, so as to block the further movement of the first connecting end portion 191 and the second connecting end portion 161 into the clamping members 17.

According to this embodiment, the first connecting end portion 191 of the first pipe element 19 is engaged with the pipe fitting seal in a manner that the outer wall 193 of the first pipe element 19 is abutted against by the inner wall of the connecting base 2 and the outer biasing portion 1, and the end wall 192 of the first pipe element 16 is abutted against by the first stopping surface 301 of the sealing ring 3, and the second connecting end portion 161 of the second pipe element 16 is engaged with the pipe fitting seal in a manner that the second end wall 162 of the second pipe element 16 is abutted against by the second stopping surface 302, so that the connecting end portions of the two pipe elements 19 and 16 are sealed at two sides of the sealing ring 3 within the movable clamping members 17.

The sealing ring 3 features two stopping surfaces 301 and 302 each is designed to abut against the end walls of the two pipe elements 19 and 16. This dual-sided sealing ensures that both pipe elements 19 and 16 are effectively sealed at their connecting end portions 191 and 161, preventing leakage from either side. This approach enhances overall sealing integrity by addressing both ends of the pipe connection simultaneously.

The stopping surfaces 301 and 302 of the sealing ring 3 act as physical barriers that prevent the first and second connecting end portions 191 and 161 from being pushed too far into the clamping members 17. This ensures the proper alignment and fit of the pipe elements 19 and 16 within the pipe fitting assembly, reducing the risk of over-insertion, which could otherwise lead to poor sealing, deformation of the sealing ring 3, or damage to the pipe elements 19 and 16.

The pipe fitting seal is designed to establish contact at various points between two pipe elements 19 and 16, with the outer biasing portion 1 abutting against the outer wall 193 of the first element 19, and the sealing ring 3 abutting against the two connecting end portions of the two pipe elements 19 and 16 at two sides thereof, this multi-point sealing ensures that both pipe elements 19 and 16 are securely sealed, reducing the risk of leakage from either side.

By distributing the sealing pressure across different areas comprising the first abutting surface 7, the second abutting inclined surface, and third abutting inclined surface 8, the design minimizes the deformation of the sealing ring 3 within a unit length. This reduces stress concentration on any single point of the pipe fitting seal, which helps lower the risk of damage over time, ultimately improving the longevity of the pipe fitting seal.

The reduced deformation and enhanced sealing at various points help ensure that the seal remains intact and functional for a longer period. Additionally, the design reduces wear and tear by avoiding excessive strain on the rubber material, thereby increasing the service life of the pipe fitting seal.

The outer sealing inclined surface 6, coupled with the deformation ring groove 5 which is formed between the outer biasing portion 1 and the abutment ring 9, allows for greater flexibility and adaptability during installation. These features provide the outer biasing portion 1 with sufficient space for deformation and prevent warping during sealing. This improves the overall fit and ensures the seal can adapt to slight variations in pipe element dimensions, The deformation ring groove 5 serves a dual purpose. It not only allows space for the outer biasing portion 1 to deform but also utilizes the pressure from liquid flow inside the pipe elements 19 and 16 to press the outer sealing inclined surface 6 more firmly against the first pipe element 19. This pressure-assisted sealing mechanism enhances the overall effectiveness of the seal, ensuring a tighter and more secure connection even under fluid pressure.

The presence of the abutment ring 9, along with the second and third abutting inclined surfaces 4 and 8, helps evenly distribute the sealing force across the pipe fitting seal, improving its efficiency. The abutment ring 9 enhances the contact between the pipe fitting seal and the first pipe element 19, further reinforcing the connection.

The present invention further provides a pipe fitting arrangement which comprises a pipe fitting assembly 200 and a first pipe element 19, the pipe fitting assembly 200 comprises at least two movable clamping members 17 and a pipe fitting seal 100 disposed in the at least two movable clamping members 17, wherein the pipe fitting assembly 200 is preinstalled on the second pipe element 19 by the pre-installing portion 18, so that the pipe fitting arrangement can be transported to a destination for coupling with the second pipe element 16. As shown in FIG. 29, two pipe fitting assemblies 200 can be pre-installed on two end portions of the first pipe element 19.

Both of the first pipe element 19 and the second pipe element 16 can be pipe, 45-degree elbow, 90-degree elbow, reducer, straight tee, or straight cross. The inner diameter of the sealing ring 3 is the same as the inner diameter of the first pipe element 19 and the inner diameter of the second pipe element 16. In the embodiment shown in FIGS. 29 and 30, an outer diameter of the first connecting end portion 191 of the first pipe element is smaller than an outer diameter of the second connecting end portion 161 of the second pipe element 16.

In the pre-installing state, the first connecting end portion 191 of the first pipe element 19 is inserted into the pipe fitting assembly 200 and is retained within the pipe fitting seal 100 and the movable clamping members 17, the outer biasing portion 1 of the pipe fitting seal 100 is biasing against the outer wall 193 of the first connecting end portion 191 of the first pipe element 19 while the first stopping surface of the sealing ring 3 is biasing against the end wall 192 of the first connecting end portion 191 of the first pipe element 19.

When connecting the second pipe element 16 to the pipe fitting arrangement, the second connecting end portion 161 is inserted into the movable clamping elements 17, the second stopping surface 302 of the sealing ring 3 will block the further movement of the second connecting end portion 161 of the second pipe element 16, so that the sealing ring 3 is sandwiched between the two connecting end portions 191 and 161 of the two pipe elements 19 and 16, while the limit stop rings 21 of the movable clamping members 17 will engage with the corresponding limit ring grooves 26 of the pipe elements 19 and 16.

When the fastener 20 is operated by the user to fasten the movable clamping members 17, the first limiting surface 24 of each movable clamping member 17 is driven to abut against the first abutting surface 7, the second limiting surface 22 and the third limiting surface 25 of each movable clamping member 17 are driven to abut against the second abutting inclined surface 4 and the third abutting inclined surface 8, so that the first abutting surface 7 is squeezed to drive the outer biasing portion 1 to abut against the outer wall 193 of the first pipe element 19, the third abutting inclined surface 8 is squeezed to drive the abutment ring 9 to abut against the outer wall 193 of the first pipe element 19, thereby achieving sealing of the first pipe element 19. Under the action of the third abutting inclined surface 8, not only can the abutment ring 9 abut against the first pipe element 19, thereby enhancing the sealing of the first pipe element 19 on the side adjacent to the outer biasing portion 1; but also, under the action of the third abutting inclined surface 8 and the second abutting inclined surface 4, the pressure of the second abutting inclined surface 4 can better act on the sealing ring 3, so that the sealing ring 3 can more firmly abut against the second connecting end portion 161 of the second pipe element 161 which is away from the end of the outer biasing portion 1, thereby improving the sealing effect of the pipe fitting seal 100.

With reference to FIGS. 13-28 and 31-33, the pipe fitting seal 100 of the present invention can comprise the inner biasing portion 12 which is integrally extended from an inner portion of the sealing ring 3, the inner biasing portion 12 is arranged for being inserted into the second connecting end portion 161 of the second pipe element 16, so as to further enhance the sealing effect of the pipe fitting seal 100 to the second pipe element 16. As shown in FIGS. 31-33, the inner biasing portion 12 is abutting against the inner wall 164 of the second connecting end portion 161 of the second pipe element 16.

As shown in FIGS. 15-20, a plurality of sealing pressing blocks 10 can be integrally protruded from the second stopping surface 302 for abutting against the end wall 162 of the second connecting end portion 161 of the second pipe element 16 . . . . As shown in FIGS. 3-8, A plurality of sealing pressing blocks 10 or an integral ring-shaped sealing pressing block 10 can also be integrally protruded from the first stopping surface 301 for abutting against the end wall 192 of the first connecting end portion 191 of the first pipe element 19, so that the sealing ring 3 can be better squeezed to connect and ensure the sealing of the pipe fitting seal 100.

The above are all preferred embodiments of the present application, and the 5 protection scope of the present application is not limited thereto. Therefore, any equivalent changes made according to the structure, shape, and principle of the present application should be included in the protection scope of the present application.

What is claimed is:

1. A pipe fitting seal for sealing a first pipe element and a second pipe element, comprising:

a sealing ring for being arranged between the first pipe element and the second pipe element;

a connecting base extended from an outside of said sealing ring; and an outer biasing portion extended from an inner side of said connecting base, wherein said connecting base comprises a first abutting surface which is capable of being squeezed to drive said outer biasing portion to abut against an outer wall of the first pipe element, and a second abutting inclined surface which is capable of being squeezed to allow said sealing ring to be driven to abut against an end of the second pipe element, wherein said second abutting inclined surface has a gradually increasing diameter along a direction toward said sealing ring;

wherein said sealing ring comprise a first stopping surface and a second stopping surface at two sides thereof, wherein the first pipe element comprises a first connecting end portion having an end wall, the second pipe element comprises a second connecting end portion having an end wall, wherein the first stopping surface is capable of abutting against the end wall of the first connecting end portion of the first pipe element, wherein the second stopping surface is capable of abutting against the end wall of the second connecting end portion of the second pipe element;

wherein an abutment ring is provided on said inner side of said connecting base, and a third abutting inclined surface is provided on an outer side of said connecting base, wherein said third abutting inclined surface is extended from second stopping surface of said sealing ring, so as to be located between said second stopping surface of said sealing ring and said first abutting surface of said connecting base, wherein said first abutting surface of said connecting base and said third abutting inclined surface are arranged at a same side of said second stopping surface, wherein said third abutting inclined surface has a gradually reducing diameter along a direction toward said sealing ring, wherein said third abutting inclined surface is capable of being squeezed to drive said abutment ring to abut against the outer wall of the first pipe element;

wherein an outer sealing inclined surface is provided on a side of said outer biasing portion away from said connecting base for abutting against the outer wall of the first pipe element, wherein said outer sealing inclined surface is extended from said second abutting inclined surface and has a gradually reducing diameter along a direction toward said sealing ring.

2. The pipe fitting seal according to claim 1, further having a deformation ring groove defined at a side of said outer biasing portion adjacent to said abutment ring.

3. The pipe fitting seal according to claim 1, wherein two sides of said sealing ring are respectively provided with abutting arc surfaces for abutting against the first pipe element and the second pipe element.

4. The pipe fitting seal according to claim 3, wherein at least one sealing pressing block is provided on a side of said sealing ring adjacent to said outer biasing portion.

5. A pipe fitting seal for sealing a first pipe element and a second pipe element, comprising:

a sealing ring for being arranged between the first pipe element and the second pipe element;

a connecting base extended from an outside of said sealing ring;

an outer biasing portion extended from an inner side of said connecting base, wherein said connecting base comprises a first abutting surface which is capable of being squeezed to drive said outer biasing portion to abut against an outer wall of the first pipe element, and a second abutting inclined surface which is capable of being squeezed to allow said sealing ring to be driven to abut against an end of the second pipe element;

an inner biasing portion provided on a side of said sealing ring away from said connecting base for abutting against an inner wall of the second pipe element; and a deformable pressing ring provided on a side of said inner biasing portion away from said sealing ring, and an outer diameter of said deformable pressing ring gradually increases in a direction away from said inner biasing portion for abutting against the inner wall of the second pipe element.

6. The pipe fitting seal according to claim 5, further comprising a transition arc surface provided on an inner side of said deformable pressing ring, and an inner diameter of said deformable pressing ring gradually increases in a direction away from said inner biasing portion.

7. The pipe fitting seal according to claim 6, further comprising a limiting ring integrally formed on an outer side of said inner biasing portion for plug-fitting with the inner wall of the second pipe element.

8. The pipe fitting seal according to claim 7, wherein said limiting ring is integrally extended from said deformable pressing ring.

9. The pipe fitting seal according to claim 7, wherein said limiting ring is protruded from said inner biasing portion and is located between said sealing ring and said deformable pressing ring, wherein the inner wall of the second pipe element is provided with a drag-reducing ring groove which is plug-fitting with the inner biasing portion, wherein a limiting slot is formed in the drag-reducing ring groove to engaged with said limiting ring.

10. The pipe fitting seal according to claim 5, wherein said deformable pressing ring has an outer inclined surface, an outer diameter of said outer inclined surface of said deformable pressing ring gradually increases in a direction away from said inner biasing portion for abutting against the inner wall of the second pipe element.

* * * * *